United States Patent
Sundararajan et al.

(10) Patent No.: US 10,674,351 B2
(45) Date of Patent: Jun. 2, 2020

(54) ANTENNA PORT COMPATIBILITY SIGNALING

(71) Applicant: QUALCOMM Incorporated, San Diego, CA (US)

(72) Inventors: Jay Kumar Sundararajan, San Diego, CA (US); Alexandros Manolakos, San Diego, CA (US); Naga Bhushan, San Diego, CA (US); Joseph Binamira Soriaga, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/007,771

(22) Filed: Jun. 13, 2018

(65) Prior Publication Data

US 2018/0367986 A1 Dec. 20, 2018

(30) Foreign Application Priority Data

Jun. 16, 2017 (GR) .............................. 20170100272

(51) Int. Cl.
*H04W 8/24* (2009.01)
*H04B 7/0404* (2017.01)
(Continued)

(52) U.S. Cl.
CPC ............ *H04W 8/24* (2013.01); *H04B 7/0404* (2013.01); *H04B 7/0691* (2013.01);
(Continued)

(58) Field of Classification Search
CPC ... H04W 8/24; H04W 72/1205; H04W 88/02; H04B 7/0874; H04B 7/0691; H04B 7/0404
See application file for complete search history.

(56) References Cited

U.S. PATENT DOCUMENTS

2013/0301454 A1* 11/2013 Seol ...................... H04B 7/043
370/252
2015/0036556 A1* 2/2015 Imamura ............... H04W 28/06
370/277
(Continued)

OTHER PUBLICATIONS

NPL, LG Electronics: "Discussion on UL Beam Management", 3GPP Draft; R1-1707605, Discussion on UL Beam Management Final, 3GPP; RAN WG1, Meeting #89, Hangzhou, China; May 15, 2017-May 19, 2017, May 14, 2017 (May 14, 2017), XP051272813, 6 pages (Year: 2017).*

(Continued)

*Primary Examiner* — Lan-Huong Truong
(74) *Attorney, Agent, or Firm* — Holland & Hart LLP

(57) ABSTRACT

Methods, systems, and devices for wireless communication are described. A user equipment (UE) capable of supporting multiple antenna ports may determine that some combinations of antenna ports can be used simultaneously. The UE may make this determination by evaluating the relationships between the physical antennas and the transmit chains included in the UE. Upon determining that the combinations of antenna ports can be used simultaneously, the UE may send a message to a base station. The message may indicate whether two or more antenna ports can be used at the same time. The UE may communicate simultaneously over one or more antenna ports based on the scheduling information from the base station which takes into account the ability of the combination of antenna ports to be used concurrently.

28 Claims, 12 Drawing Sheets

(51) Int. Cl.
  *H04B 7/08* (2006.01)
  *H04B 7/06* (2006.01)
  *H04W 72/12* (2009.01)
  *H04W 88/02* (2009.01)

(52) U.S. Cl.
  CPC ...... *H04B 7/0874* (2013.01); *H04W 72/1205* (2013.01); *H04W 88/02* (2013.01)

(56) References Cited

U.S. PATENT DOCUMENTS

2015/0043466 A1* 2/2015 Yoshida ............... H04W 72/04 370/329
2015/0282122 A1 10/2015 Kim et al.
2018/0227094 A1* 8/2018 Liu ....................... H04L 5/0025

OTHER PUBLICATIONS

CATT: "Remaining issues on non-codebook based UL transmission", 3GPP Draft; R1-1806277, 3rd Generation Partnership Project (3GPP), Mobile Competence Centre ; 650, Route Des Lucioles; F-06921 Sophia-Antipolis Cedex; France, vol. RAN WG1, no. Busan, Korea; May 21, 2018-May 25, 2018, May 20, 2018 (May 20, 2018), XP051441484, 7 pages, Retrieved from the Internet: URL: http://www.3gpp.org/ftp/Meetings%5F3GPP%5FSYNC/RAN1/Docs/ [retrieved on May 20, 2018].
Intel Corporation: "Summary on Codebook Based UL Transmission", 3GPP Draft; R1-1807669, Summary on Codebook Based UL Transmission R1, 3rd Generation Partnership Project (3GPP), Mobile Competence Centre; 650, Route Des Lucioles; F-06921 Sophia-Antipolis Cedex; FR, vol. RAN WG1, no. Busan, Korea; May 21, 2018-May 25, 2018, May 24, 2018 (May 24, 2018), XP051463300, pp. 1-18, Retrieved from the Internet: URL: http://www.3gpp.org/ftpjtsg%5Fran/WG1%5FRL1/TSGR1%5F93/Docs [retrieved on May 24, 2018].
International Search Report and Written Opinion—PCT/US2018/037555—ISA/EPO—dated Sep. 21, 2018.
LG Electronics: "Discussion on UL Beam Management", 3GPP Draft; R1-1707605, Discussion on UL Beam Management Final, 3rd Generation Partnership Project (3GPP), Mobile Competence Centre; 650, Route Des Lucioles; F-06921 Sophia-Antipolis Cedex; France, vol. RAN WG1, no. Hangzhou, China; May 15, 2017-May 19, 2017, May 14, 2017 (May 14, 2017), XP051272813, 6 pages, Retrieved from the Internet: URL: http://www.3gpp.org/ftp/Meetings_3GPP_SYNC/RAN1/Docs/ .

* cited by examiner

ANTENNA PORT COMPATIBILITY SIGNALING

BACKGROUND

The present Application for patent claims priority to Greek Provisional Patent Application No. 20170100272 by Sundararajan et al., entitled "Antenna Port Compatibility Signaling," filed Jun. 16, 2017, assigned to the assignee hereof, and expressly incorporated by reference in its entirety.

The following relates generally to wireless communication, and more specifically to antenna port compatibility signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a UE may include multiple antenna ports that the UE can use simultaneously to increase communication performance. However, not all combinations of the UE's antenna ports may support simultaneous transmission or reception. For example, a pair of antenna ports may be configured so that simultaneous transmission or reception is not possible. Scheduling of uplink or downlink transmissions by a base station for unsupported combinations of antenna ports may impair reception of the downlink or uplink transmissions.

SUMMARY

The described techniques relate to improved methods, systems, devices, or apparatuses that support antenna port compatibility signaling. A user equipment (UE) with multiple antenna ports may determine which of the antenna ports can be used concurrently and which cannot. For example, the UE may determine that a first combination of antenna ports can be used concurrently but that another combination of antenna ports cannot be used concurrently. The antenna ports that cannot be used concurrently may be constrained by the number of transmit chains available or by the connection of the transmit chains to the physical antennas associated with the antenna ports. After determining the combinations of antenna ports that can and cannot be used concurrently, the UE may convey this information to a base station responsible for scheduling the UE. In some cases, the UE may report a delay constraint for the combinations of antenna ports that cannot be used concurrently. This delay constraint may indicate how long the UE must wait in between using different antenna ports in a combination that does not support concurrent use. The base station may leverage the information from the UE to schedule communications with the UE. For example, the base station may schedule the UE in a manner that takes advantage of the antenna ports that can be used concurrently. The base station may avoid scheduling communications with the UE that require concurrent use of antenna ports that have been reported as incompatible for concurrent use.

A method of wireless communication at a user equipment (UE) having a plurality of antenna ports is described. The method may include identifying a compatibility of at least one antenna port combination of the plurality of antenna ports for coincident use by the UE, transmitting a message to a base station indicating whether two or more antenna ports are available for coincident use based at least in part on the identified compatibility, and communicating with the base station via at least one of the plurality of antenna ports. The at least one of the plurality of antenna ports may be selected based at least in part on the identified compatibility.

An apparatus for wireless communication at a user equipment (UE) having a plurality of antenna ports is described. The apparatus may include means for identifying a compatibility of at least one antenna port combination of the plurality of antenna ports for coincident use by the UE, means for transmitting a message to a base station indicating whether two or more antenna ports are available for coincident use based at least in part on the identified compatibility, and means for communicating with the base station via at least one of the plurality of antenna ports. The at least one of the plurality of antenna ports may be selected based at least in part on the identified compatibility.

Another apparatus for wireless communication at a user equipment (UE) having a plurality of antenna ports is described. The apparatus may include a processor, memory in electronic communication with the processor, and instructions stored in the memory. The instructions may be operable to cause the processor to identify a compatibility of at least one antenna port combination of the plurality of antenna ports for coincident use by the UE, transmit a message to a base station indicating whether two or more antenna ports are available for coincident use based at least in part on the identified compatibility, and communicate with the base station via at least one of the plurality of antenna ports. The at least one of the plurality of antenna ports may be selected based at least in part on the identified compatibility.

A non-transitory computer readable medium for wireless communication at a user equipment (UE) having a plurality of antenna ports is described. The non-transitory computer-readable medium may include instructions operable to cause a processor to identify a compatibility of at least one antenna port combination of the plurality of antenna ports for coincident use by the UE, transmit a message to a base station indicating whether two or more antenna ports are available for coincident use based at least in part on the identified compatibility, and communicate with the base station via at least one of the plurality of antenna ports. The at least one of the plurality of antenna ports may be selected based at least in part on the identified compatibility.

Some examples of the method, apparatus, and non-transitory computer-readable medium described above may further include processes, features, means, or instructions for determining a delay constraint between using antenna ports in the at least one antenna port combination. Some examples of the method, apparatus, and non-transitory computer-readable medium described above may further include processes, features, means, or instructions for transmitting an indication of the delay constraint in the message to the base station.

In some examples of the method, apparatus, and non-transitory computer-readable medium described above, the message indicates a plurality of antenna port combinations and corresponding delay constraints between using antenna ports for each of the plurality of antenna ports combinations. The delay constraint may indicate a duration of time between using antenna ports in the corresponding antenna port combination. In some examples of the method, apparatus, and non-transitory computer-readable medium described above, a zero delay indicates that the at least one antenna port combination is compatible for concurrent use and a non-zero delay indicates that the at least one antenna port combination comprises an antenna port that supports use after expiry of the delay from use of another antenna port of the at least one antenna port combination.

Some examples of the method, apparatus, and non-transitory computer-readable medium described above may further include processes, features, means, or instructions for receiving a scheduling message from the base station indicating an uplink precoder for the at least one of the plurality of antenna ports for communicating with the base station. Some examples of the method, apparatus, and non-transitory computer-readable medium described above may further include processes, features, means, or instructions for applying the uplink precoder to the at least one of the plurality of antenna ports.

Some examples of the method, apparatus, and non-transitory computer-readable medium described above may further include processes, features, means, or instructions for receiving a scheduling message from the base station indicating the at least one of the plurality of antenna ports. Some examples of the method, apparatus, and non-transitory computer-readable medium described above may further include processes, features, means, or instructions for receiving a downlink transmission over the at least one of the plurality of antenna ports. Some examples of the method, apparatus, and non-transitory computer-readable medium described above may further include processes, features, means, or instructions for detecting that the at least one antenna port combination comprises antenna ports that share a transmit chain, wherein identifying the compatibility comprises determining that the at least one antenna port combination is incompatible for coincident use based on the detection.

Some examples of the method, apparatus, and non-transitory computer-readable medium described above may further include processes, features, means, or instructions for detecting that the at least one antenna port combination comprises antenna ports with independent transmit chains. In some examples, identifying the compatibility comprises determining that the at least one antenna port combination is compatible for coincident use based on the detection. Some examples of the method, apparatus, and non-transitory computer-readable medium described above may further include processes, features, means, or instructions for determining a ratio of transmit chains to physical antennas for the at least one antenna port combination, wherein the identifying is based on the ratio.

Some examples of the method, apparatus, and non-transitory computer-readable medium described above may further include processes, features, means, or instructions for detecting that a first antenna port and a second antenna port of the at least one antenna port combination share a physical antenna. In some examples, identifying the compatibility comprises determining that the at least one antenna port combination is compatible for coincident use based on the detection.

Some examples of the method, apparatus, and non-transitory computer-readable medium described above may further include processes, features, means, or instructions for detecting that a first antenna port and a second antenna port of the at least one antenna port combination do not share a physical antenna. In some examples, identifying the compatibility comprises determining that the at least one antenna port combination is incompatible for coincident use based on the detection.

Some examples of the method, apparatus, and non-transitory computer-readable medium described above may further include processes, features, means, or instructions for detecting that a number of physical antennas associated with the at least one antenna port combination are co-located on an antenna panel. In such examples, identifying the compatibility is based on the detection.

In some examples of the method, apparatus, and non-transitory computer-readable medium described above, the message comprises a compatible port set indicating that two or more antenna ports are available for concurrent use. In some examples of the method, apparatus, and non-transitory computer-readable medium described above, the compatibility of compatible port set is indicated via a bit-map or matrix.

In some examples of the method, apparatus, and non-transitory computer-readable medium described above, the message comprises an incompatible port set indicating that the at least one antenna port combination is incompatible for concurrent use. In some examples of the method, apparatus, and non-transitory computer-readable medium described above, the message comprises a compatible port set indicating a first set of antenna port combinations that are compatible for concurrent use and an incompatible port set indicating a second set of antenna port combinations that are incompatible for concurrent use.

In some examples of the method, apparatus, and non-transitory computer-readable medium described above, the message may include an indication of a number of antenna ports available for coincident use.

DETAILED DESCRIPTION

Figure 1:
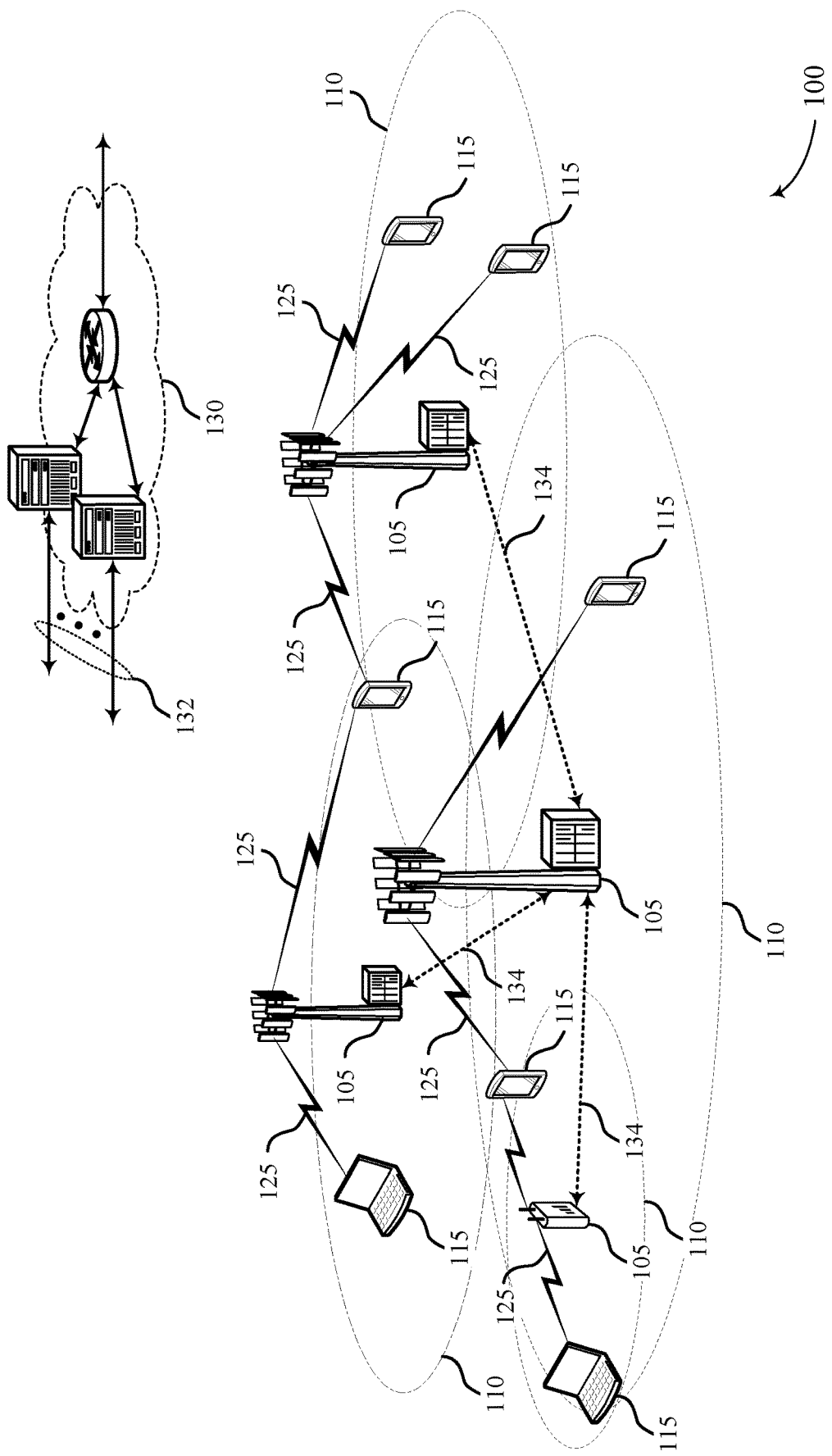
FIG. 1 illustrates an example of a system for wireless communication that supports Antenna port compatibility signaling in accordance with aspects of the present disclosure.

Some wireless communications may involve a user equipment (UE) using multiple antenna ports concurrently. For example, in New Radio (NR), a UE may use multiple antenna ports (e.g., uplink transmission ports) concurrently to send multiple precoded sounding reference signals (SRS) on the same symbol. Or the UE may use multiple antenna ports at once when communicating over multiple layers (e.g., rank>1) using multiple-input-multiple-output (MIMO) techniques. In some cases, a UE's implementation or design may constrain which antenna ports can be used at the same time, if any, and thus whether any two or more antenna ports may be available for coincident use. For example, some antenna ports may not be used together if they share a transmit chain. Also, some combinations of antenna ports may not support concurrent use if the number of transmit chains is greater than the number of physical antennas associated with the antenna ports. For a combination of antenna ports that cannot be used concurrently, there may be constraints on the time needed between using the antenna ports in the combination. For example, in a two-port combination, there may be a delay in between using the first port and using the second port.

If a base station scheduling a UE is unaware that the UE is subject to such constraints, the base station may attempt to schedule the UE in a manner that cannot be implemented by the UE. For example, the base station may schedule the UE to communicate concurrently over a combination of antenna ports that do not support concurrent use. Additionally or alternatively, the base station may schedule the UE in a manner that fails to take advantage of the UE's ability to communicate over some antenna ports concurrently. For example, the base station may schedule (e.g., in a reference signal configuration message) the UE to transmit multiple SRS across several different transmit time intervals (TTIs), rather than in the same TTI. Thus, a base station's lack of knowledge of the UE's capabilities may impair communications and reduce efficiency.

According to the techniques described herein, a UE may determine which combinations of its antenna ports are compatible for concurrent use and which are not. The UE may send this information to a serving base station. For example, the UE may send a message that indicates a) the antenna port combinations that are compatible for concurrent use and/or b) the antenna port combinations that are incompatible for concurrent use. In some examples, the message may indicate a threshold number, where any combination up to the threshold number of antenna ports is compatible for concurrent use but any combination with more than the threshold number of antenna ports is not compatible for concurrent use. In some cases, the UE may also convey the delay constraint value for each combination of antenna ports that is incompatible for concurrent use. However, the UE may refrain from sending extraneous information to the serving base station, such as the implementation details which caused the constraints to arise. For example, the UE may refrain from sending the base station indications of the antenna-to-port mapping used by the UE or the number of transmit chains available at the UE.

Based on the information from the UE, the base station may incorporate the constraints of the UE into its scheduling decisions. For example, the base station may select a precoder for the UE that allows the UE to simultaneously use a combination of antenna ports that are compatible for concurrent use. In another example, the base station may avoid selecting a precoder for the UE that requires the UE to simultaneously use a combination of antenna ports that are incompatible for concurrent use. The base station may make these selections without knowing the implementation details associated with the UE's constraints.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. A UE 115 may be capable of communicating using multiple antenna ports, but not all combinations of antenna ports may be support simultaneous use. A UE 115 may determine which antenna port combinations are compatible for concurrent use and indicate these combinations to a base station 105. The base station 105 may take the compatibly of the antenna ports into account when scheduling communications with the UE 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

UEs 115 may include a communication manager, which may facilitate antenna port compatibility signaling. A UE 115 may include multiple antenna ports (e.g., uplink transmission ports and downlink transmission ports) associated with a number of physical antennas. Although some combinations of the antenna ports may be used concurrently, the implementation or design of a UE 115 may prevent other combinations of antenna ports from being used concurrently. For example, the number of transmit chains, or their connection to the UE's physical antennas, may limit which combinations of antenna ports can be used concurrently.

If a base station 105 is unaware of a UE's analog beamforming constraints, the base station 105 may inefficiently schedule the UE 115 for communications, or schedule the UE 115 for communications that the UE 115 does not support. In an example of inefficient scheduling, the base station 105 may schedule the UE 115 (e.g., in a reference signal configuration message) to send multiple sounding reference signals (SRS) over a corresponding number of symbols when the UE 115 could have sent the SRS over a single symbol by using multiple antenna ports at once. In an example of unsupported scheduling, the base station 105 may schedule the UE 115 to send multiple SRS concurrently over a combination of antenna ports that are not compatible with concurrent use (e.g., the base station 105 may direct the UE 115 to use a precoder that the UE 115 does not support).

According to the techniques described herein, a UE 115 may identify the compatibility of multiple combinations of antenna ports for coincident use. As used herein, coincident use refers to concurrent use and/or use within a given delay threshold. A combination of antenna ports may be compatible for coincident use if the antenna ports in the combination can be used concurrently or proximately (e.g., one at a time after a delay has elapsed in between use). Additionally or alternatively, the UE 115 may identify which combinations of antenna ports are incompatible for concurrent or coincident use. The UE 115 may report the compatibility of the antenna port combinations to a base station 105. However, the UE 115 may not report the implementation details of the UE's transmit chains and physical antennas to the base station 105. Thus, overhead signaling may be reduced and the implementation details of the transmit chains and physical antennas may be transparent to the base station 105. Using the compatibility information from the UE 115, the base station 105 may schedule communications with the UE 115 that avoid improper use of incompatible antenna port combinations but take advantage of compatible antenna port combinations.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple physical antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the physical antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
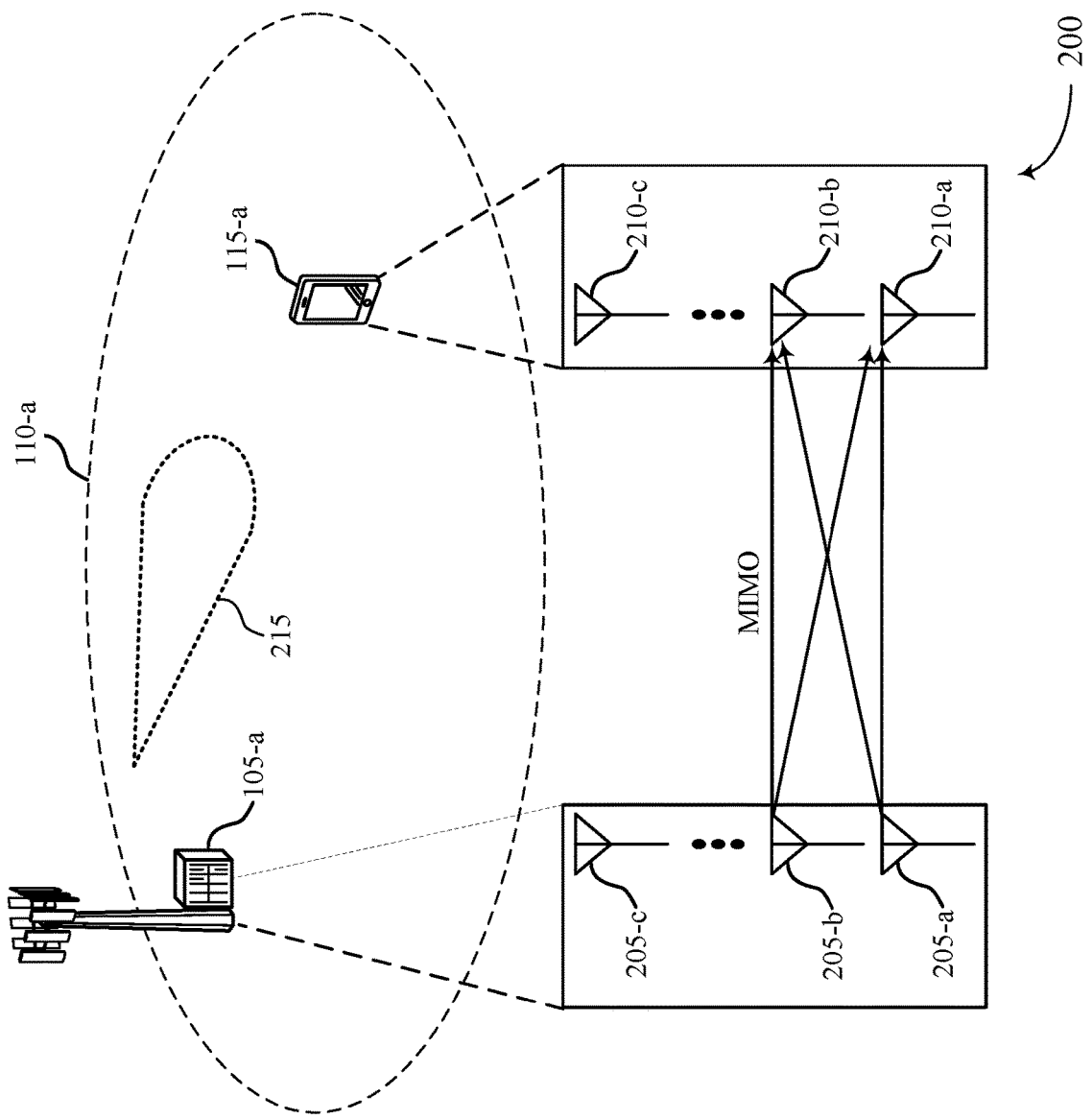
FIG. 2 illustrates an example of a wireless communications system that supports antenna port compatibility signaling in accordance with aspects of the present disclosure.

FIG. 2 illustrates an example of a wireless communications system 200 for antenna port compatibility signaling in accordance with various aspects of the present disclosure. Wireless communications system 200 includes base station 105-a and UE 115-a, which may be examples of the corresponding devices described with reference to FIG. 1. Base station 105-a may communicate with wireless devices inside coverage area 110-a; for example, base station 105-a may communicate with UE 115-a over a wireless channel via a communication link. Base station 105-a and UE 115-a may be capable of communicating over multiple antenna ports simultaneously. According to the techniques described herein, UE 115-a may inform base station 105-a of the antenna ports that support simultaneous communication and/or of those that do not.

Base station 105-a may include multiple antennas 205 (e.g., n antennas). For example, base station 105-a may include antenna 205-a, antenna 205-b, and antenna 205-c. UE 115-a may also include multiple antennas 210. For example, UE 115-a may include antenna 210-a, 210-b, and 210-c. Each antenna may be coupled with processing circuitry, which may include one or more transmit chains and/or one or more receive chains. Although shown with the same number of antennas, base station 105-a and UE 115-a may include different numbers of antennas. In some cases, an antenna may be associated with multiple transmit or receive chains, or multiple antennas may share a transmit or receive chain. UE 115-a may define multiple antenna ports, which may be mapped to precoders that are associated with multiple physical antennas 210.

In some cases, UE 115-a may employ MIMO techniques in which UE 115-a uses multiple antenna ports to receive communications from base station 105-a, which also uses multiple antenna ports to transmit. MIMO may use a technique called spatial division multiplexing that takes advantage of the multiple transmit and receive chains to send multiple streams of data simultaneously on the same wireless channel, thereby increasing data rate and overall throughput. In some cases, base station 105-*a* and/or UE 115-*a* may use beamforming to send a MIMO transmission. For example, base station 105-*a* may send a beamformed transmission 215 to UE 115-*a*. Prior to sending a beamformed transmission over a channel, base station 105-*a* may gather information about the channel. Base station 105-*a* (as beamformer) may use the information to determine a beamforming steering matrix that is used to direct transmissions towards the UE as the target device(s). The transmissions may be directed by applying weights to antennas within an antenna array (e.g., as defined by the beamforming matrix) so that constructive and destructive interference focuses the energy of the transmission in a particular direction.

In some cases, an application may call for multiple antenna ports (e.g., multiple uplink transmission ports) to be used at once. For example, base station 105-*a* may instruct UE 115-*a* to send multiple precoded SRS on the same symbol. Or multiple antenna ports may be used simultaneously to implement uplink MIMO with rank>1 (e.g., multiple layers). But some or all antenna ports may not be configured for simultaneous use. According to the techniques described herein, UE 115-*a* may determine which antenna ports support simultaneous use and send a message that indicates these antenna ports to base station 105-*a*. In some examples, the message may include an indication of a number of antenna ports available for coincident use. For example, the message may include an indication that no antenna ports are available for coincident use, an indication that two antenna ports are available for coincident use, or an indication that some other number of antenna ports are available for coincident use. Based on the antenna port information, base station 105-*a* may assign scheduling resources and precoders to UE 115-*a*. UE 115-*a* may communicate according to the scheduling assignment(s) from base station 105-*a*.

Figure 3:
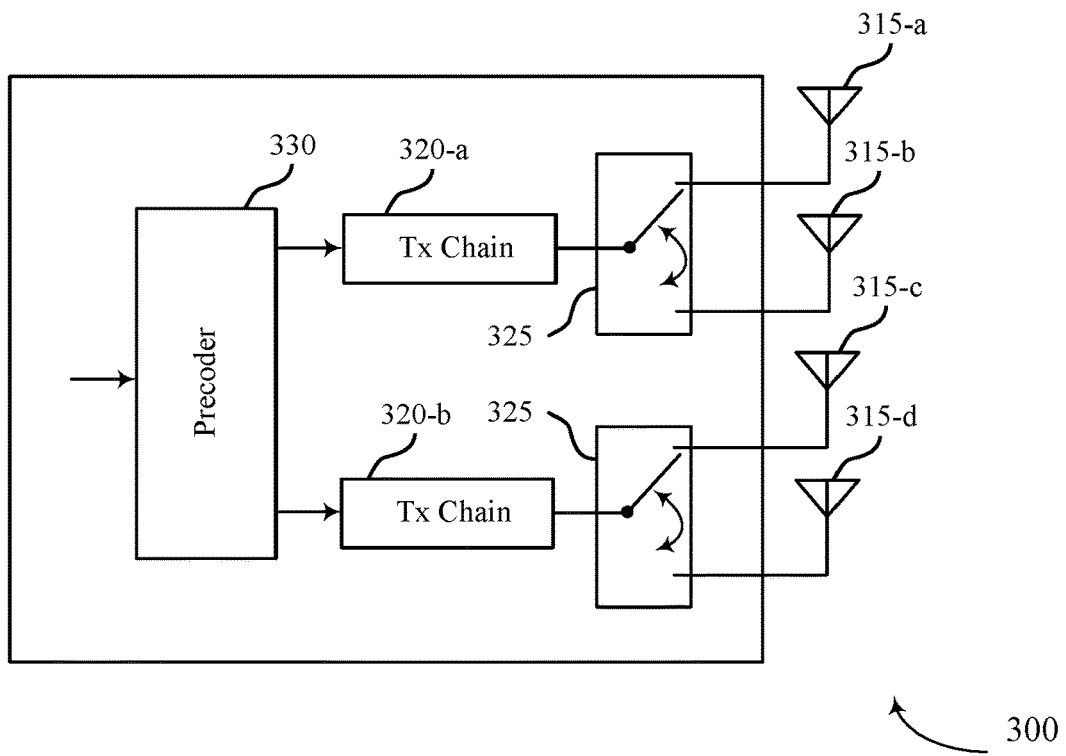
FIG. 3 illustrates an example of a transmitter that supports antenna port compatibility signaling in accordance with aspects of the present disclosure.

FIG. 3 illustrates an example of a transmitter 300 for use in antenna port compatibility signaling in accordance with various aspects of the present disclosure. Transmitter 300 may be part of a base station 105 or UE 115, which may be examples of the corresponding devices described with reference to FIG. 1. Transmitter 300 may be part of a transceiver that includes a receiver with which the transmitter may share a number of physical antennas 315. The physical antennas 315 may be associated with antenna ports, some of which may be constrained from concurrent use due to, e.g., shared processing circuitry such as transmit chains 320. A UE 115 may detect which combinations of antenna ports are prohibited from concurrent use (e.g., incompatible for simultaneous use) and report these combinations to a base station 105. Additionally or alternatively, the UE 115 may detect which antenna port combinations are compatible for concurrent use and report these combinations to the base station 105.

Transmitter 300 may include two pairs of physical antennas 315, each of which may share a different transmit chain 320. For example, antenna 315-*a* and antenna 315-*b* may share transmit chain 320-*a* and antenna 315-*c* and antenna 315-*d* may share transmit chain 320-*b*. Thus, four physical antennas 315 may be managed using two transmit chains 320. A transmit chain 320 may connect to one physical antenna 315 at a time via switching circuitry 325 (e.g., transmit chain 320-*a* may switch between physical antennas 315-*a* and 315-*b* and transmit chain 320-*b* may switch between physical antennas 315-*c* and 315-*d*). Because the transmit chains 320 are shared, simultaneous use of physical antennas 315-*a* and 315-*b* is not supported and simultaneous use of physical antennas 315-*c* and 315-*d* is not supported. For example, when transmit chain 320-*a* is connected to physical antenna 315-*a*, simultaneous connection to physical antenna 315-*b* is not supported. Although two pairs of two physical antennas 315 are shown, any number of physical antennas may be included in transmitter 300. Similarly, any number of transmit chains 320 may be used and the relationship between the transmit chains 320 and the physical antennas may vary.

An antenna port may be defined by coefficients (e.g., complex weights) applied to one or more physical antennas. For example, a port may be defined as [u1 0 u2 0], where 'u1' is the complex weight applied to physical antenna 315-*a* and 'u2' is the complex weight applied to physical antenna 315-*c* (in this example a complex weight of zero is applied to physical antennas 315-*b* and 315-*d*). A transmitter 300 may apply precoding for a signal to be transmitted via one or more ports via a precoder 330. The complex weights for the physical antennas according to the antenna ports may be applied by the transmit chains 320 or the precoder 3330. For example, precoder 330 may apply a precoder such as [a 0 b 0] to a combination of fours ports (e.g., port 1, port 2, port 3, and port 4), which means that a precoding weight 'a' is applied to port 1, a precoding weight 'b' is applied to port 3, and no precoding weight is applied to ports 2 and 4. The precoder 330 and/or the transmit chains 320 may then apply the complex weights assigned to each physical antenna for the antenna ports. Thus, an antenna port may be mapped to a precoder and may involve more than one physical antenna 315. The beamforming and precoding weights may be real or complex and may be selected to facilitate beamforming and/or MIMO communications.

In some cases, the antenna ports that are supported by a transmitter 300 may be constrained by the configuration of the transmitter 300 (e.g., sharing the transmit chains 320 between multiple physical antennas 315 may preclude some antenna ports from being used concurrently or coincidently). For instance, an antenna port of [u1 u2 0 0] is not supported by the transmitter 300 because the antenna port requires physical antennas 315-*a* and 315-*b* to be used concurrently, which is not possible given the limitations of transmit chain 320-*a*. Similarly, an antenna port [0 0 u1 u2] may not be supported by the transmitter 300 because it requires concurrent use of physical antennas 315-*c* and 315-*d*, which cannot be used simultaneously.

The configuration of transmitter 300 may also impose constraints on which antenna ports are compatible for simultaneous use. For example, antenna port [u1 0 0 0] may be used simultaneously with antenna port [0 0 0 u2] (because the combination involves physical antennas 315-*a* and 315-*c*) but not antenna port [0 u2 0 0] (because the combination involves physical antennas 315-*a* and 315-*b*). Accordingly, precoder [a 0 0 b] may be supported by transmitter 300 but precoder [a b 0 0] may not be supported by transmitter 300 (because precoder [a b 0 0] ultimately applies precoding weights 'a' and 'b' to physical antennas 315-*a* and 315-*b*, which cannot be used simultaneously). Thus, a UE 115 may determine which antenna ports support simultaneous use by evaluating the connectivity between the associated physical antennas 315 and transmit chains 320. Because a UE 115 may be constrained from using certain antenna ports at all, or certain combinations of antenna ports concurrently, a UE 115 may be prevented from arbitrarily applying beamforming or precoding weights to the four physical antennas 315.

According to the techniques described herein, a UE 115 may detect (e.g., by evaluating the hardware configuration of transmitter 300) whether certain physical antennas 315 can be used concurrently, if any, and thus whether two or more antenna ports are available for coincident use. For example, the UE 115 may detect that the following pairs of physical antennas can be used concurrently: 315-*a* and 315-*c*, 315-*a* and 315-*d*, 315-*b* and 315-*c*, and 315-*b* and 315-*d*. The UE 115 may also detect that certain physical antennas 315 cannot be used concurrently (e.g., 315-*a* and 315-*b*, 315-*c* and 315-*d*). In some cases, the UE 115 may indicate to the base station which pairs of physical antennas 315 are compatible for concurrent use and/or which pairs of physical antennas 315 are incompatible for concurrent use. The UE 115 may use the physical antenna information to determine that certain antenna ports are not available for use by the UE 115 and may report these ports to a base station 105. For example, the UE 115 may send a message to the base station 105 indicating that port [u1 u2 0 0] and port [0 0 u1 u2] are not supported by the UE 115. Additionally or alternatively, the UE 115 may send a message to the base station 105 indicating the antenna ports that are supported by the UE 115 (e.g., antenna ports [u1 0 0 u2], [u1 0 u2 0], [0 u1 u2 0], and [0 u1 0 u2]). A base station may use the antenna port information to identify precoders that are not supported by the UE 115 (e.g., precoder [a b 0 0]).

The UE 115 may also detect that certain antenna port combinations do not support concurrent use and may report these combinations to the base station 105. For example, the UE 115 may send a message to the base station 105 indicating that antenna port combination [u1 0 u2 0] cannot be used concurrently with antenna port combination [0 v1 0 v2]. Additionally or alternatively, the UE 115 may send a message to the base station 105 indicating the antenna ports that are compatible for concurrent use. After informing the base station 105 of the compatibility of antenna port combinations, the UE 115 may receive scheduling information from the base station 105. The scheduling information may include which precoder to use for an uplink transmission. The UE 115 may apply the precoder to the appropriate ports and simultaneously send signals to the base station 105 over the physical antennas 315 corresponding to those ports.

In some cases, a UE 115 may determine that a combination of antenna ports supports proximate use (e.g., even if they do not support concurrent use). For example, UE 115 may determine that antenna port [u1 0 u2 0] can be used after antenna port [0 v1 0 v2] if an appropriate duration of time has elapsed in between use. The duration of time may be a delay constraint (e.g., the minimum delay or duration of time required by the UE 115 between use of the antenna ports) that is based on hardware limitations associated with switching between the two antenna ports. In some examples, the UE 115 may send a message to the base station 105 indicating a) the combination of antenna ports that supports proximate use and b) the corresponding delay associated with that combination of antenna ports, where a zero delay may mean that the antenna port combination can be used concurrently. The base station 105 may take this information into account when making scheduling decisions for the UE 115.

Figure 4:
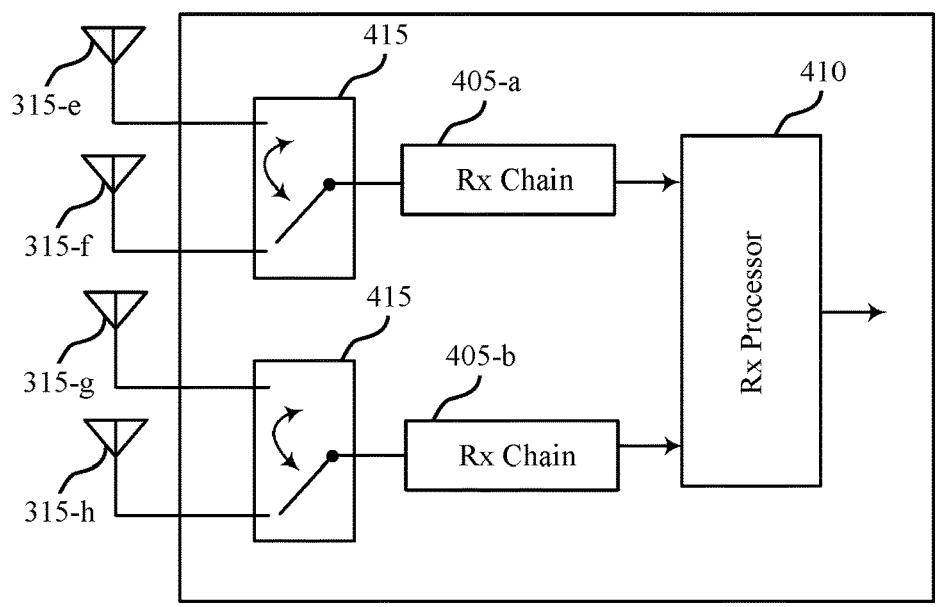
FIG. 4 illustrates an example of a receiver that supports antenna port compatibility signaling in accordance with aspects of the present disclosure.

FIG. 4 illustrates an example of a receiver 400 for use in antenna port compatibility signaling in accordance with various aspects of the present disclosure. Receiver 400 may be part of a base station 105 or UE 115, which may be examples of the corresponding devices described with reference to FIG. 1. Receiver 400 may be part of a transceiver, which may include a transmitter such as transmitter 300. Receiver 400 may include a number of physical antennas 315 that may be associated with antenna ports, some of which may be constrained from concurrent use due to, e.g., shared processing circuitry such as receive chains 320. A UE 115 may detect which combinations of antenna ports are prohibited from concurrent use (e.g., incompatible for simultaneous use) and report these combinations to a base station 105. Additionally or alternatively, the UE 115 may detect which antenna port combinations are compatible for concurrent use and report these combinations to the base station 105.

Receiver 400 may include physical antenna 315-*e* and physical antenna 315-*f*, which share receive chain 405-*a*, and physical antenna 315-*g* and physical antenna 315-*h*, which share receive chain 405-*b*. The receive chains 405 may receive signals from the physical antennas 315, process aspects of those signals, and pass them on to processing module 410 for further processing (e.g., decoding, demodulation, etc.). Using switching circuitry 415, receive chain 405-*a* may switch between physical antennas 315-*e* and 315-*f* and receive chain 405-*b* may switch between physical antennas 315-*g* and 315-*h*. Because the receive chains 405 are shared, simultaneous use of physical antennas 315-*e* and 315-*f* is not supported and simultaneous use of physical antennas 315-*g* and 315-*h* is not supported.

A UE 115 may detect which physical antennas 315 can be used simultaneously and report this information to a base station 105. Additionally or alternatively, the UE 115 may use this information to determine which antenna ports are supported by receiver 400, and of these which can be used concurrently. The UE 115 may report this antenna port compatibility information to the base station 105. For example, the UE 115 may indicate a set of antenna port combinations that are compatible for concurrent use and thus indicate that two or more antenna ports are available for coincident use. Additionally or alternatively, the UE 115 may indicate a set of antenna port combinations that are incompatible for concurrent use. In some cases, the UE 115 may decide which set to send to the base station 105 based on how many resources each set would consume. For example, the UE 115 may send the incompatible port set if transmitting the incompatible port set consumes less resources than transmitting the compatible port set. The base station 105 may schedule communications with the UE 115 based on the antenna port compatibility information from the UE 115.

Figure 5:
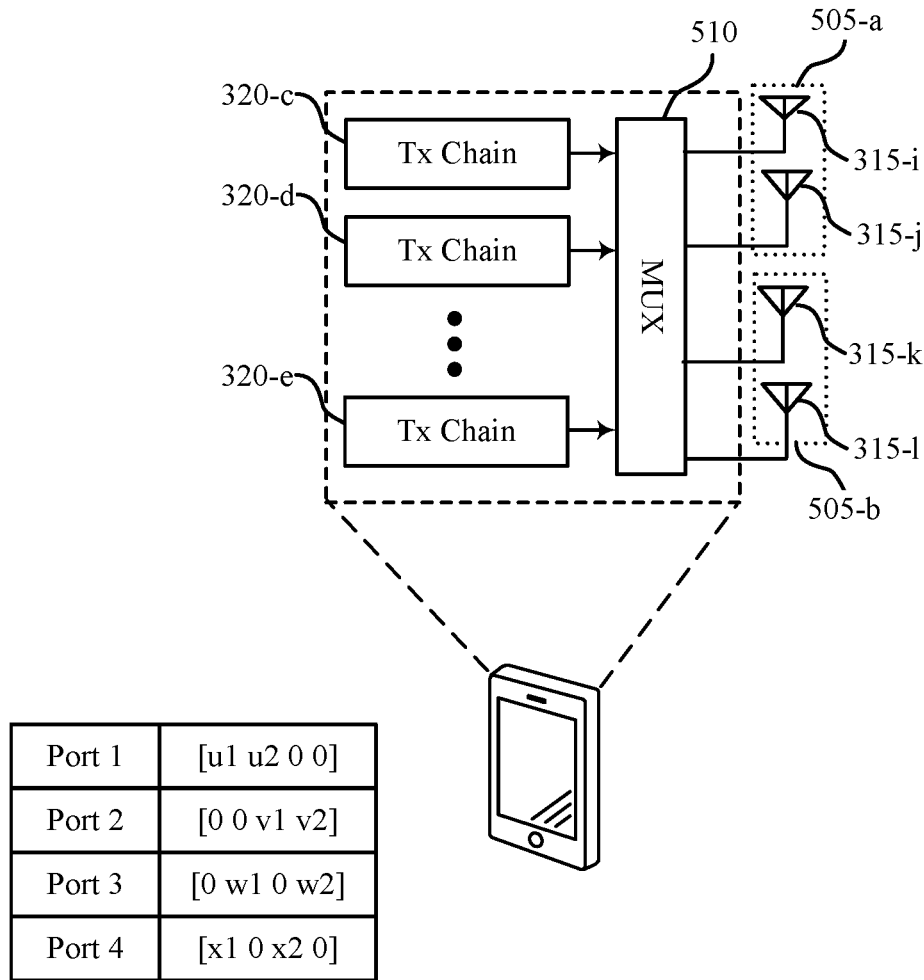
FIG. 5 illustrates an example of a user equipment that supports antenna port compatibility signaling in accordance with aspects of the present disclosure.

FIG. 5 illustrates an example of UE 500 for antenna port compatibility signaling in accordance with various aspects of the present disclosure. UE 500 may be an example of a UE 115 described with reference to FIG. 1. UE 500 may include multiple transmit chains 320, which may be examples of a transmit chain 320 described with reference to FIG. 3. UE 500 also includes physical antenna 315-*i*, physical antenna 315-*j*, physical antenna 315-*k*, and physical antenna 315-*l*. Any transmit chain 320 can be connected to any one physical antenna 315 at a time via multiplexor 510. Physical antenna 315-*i* and physical antenna 315-*j* may be co-located on antenna panel 505-*a* and physical antenna 315-*k* and physical antenna 315-*l* may be co-located on antenna panel 505-*b*. An antenna panel 505 may include a number of physical antennas 315, which may be in close physical proximity. In some instances, the physical antennas 315 on a panel may share a digital signal input (e.g., via a digital-to-analog converter (DAC)), but may have separate analog beamforming capabilities (independently applied analog beam weights). Thus, an antenna panel 505 may be used to perform analog beamforming. However, physical antennas 315 on an antenna panel 505 may not have independent digital beamforming or have independent precoders applied.

For UE 500, four ports may be defined over the four physical antennas 315: port 1 (e.g., [u1 u2 0 0]), port 2 (e.g., [0 0 v1 v2]), port 3 (e.g., [0 w1 0 w2]), and port 4 (e.g., [x1 0 x2 0]). Each beamforming weight in a port may correspond to a physical antenna 315. In this example, the first beamforming weight corresponds to physical antenna 315-$i$, the second beamforming weight corresponds to physical antenna 315-$j$, the third beamforming weight corresponds to physical antenna 315-$k$, and the fourth beamforming weight corresponds to physical antenna 315-$l$.

While some combinations of the four defined ports may be used concurrently, others may be precluded from simultaneous use due to the ratio of transmit chains 320 to physical antennas 315. This is because a separate transmit chain 320 must be assigned to a physical antenna 315 in order to apply a unique beamforming weight to that physical antenna 315. Thus, when only one transmit chain 320 is available, none of the four defined ports are supported by the UE 500 (because each port uses two physical antennas 315). When two transmit chains 320 are available, such as transmit chain 320-$c$ and transmit chain 320-$d$, the four defined antenna ports are supported by the UE 500 but they can only be used one at a time (e.g., not concurrently), and thus no two or more antennas may be available for coincident use. Put another way, when two of the defined transmit chains 320 are available, only one antenna port using two physical antennas can be used at a time since each port uses two physical antennas. When three transmit chains 320 are used, any two of the defined antenna ports that share a physical antenna 315 can be used concurrently. When four transmit chains 320 are available, any two of the defined antenna ports can be used concurrently. Thus, a UE 500 may evaluate the ratio of transmit chains to physical antennas when determining whether antenna port combinations support concurrent use. If the ratio of transmit chains to physical antennas is less than 1, UE 500 may determine which antenna port combinations support concurrent use by determining whether any of the antenna ports in a combination share a physical antenna.

For example, when three transmit chains 320 are used (e.g., transmit chain 320-$c$, transmit chain 320-$d$, and transmit chain 320-$e$), port 1 and port 3 can be used concurrently because they share physical antenna 315-$j$. Port 1 and port 4 can be used concurrently because they share physical antenna 315-$i$. Port 2 and port 3 can be used concurrently because they share physical antenna 315-$l$. And port 2 and port 4 can be used concurrently because they share physical antenna 315-$k$. However, port 1 and port 2 cannot be used concurrently and port 3 and port 4 cannot be used concurrently because they do not share a physical antenna 315. Thus, UE 500 may simultaneously use two antenna ports with different precoders as long as the two ports share at least one physical antenna 315.

According to the techniques described herein, UE 500 may determine that the ratio of transmit chains 320 to physical antennas 315 prevents simultaneous use of certain antenna ports and report that finding to a base station 105. For example, UE 500 may transmit a message (e.g., an antenna port compatibility message) to the base station 105 that indicates which of the defined antenna ports can be used concurrently and which cannot be used concurrently. In some cases, the UE 500 may include a delay constraint with each antenna port combination. The delay constraint may indicate a minimum duration of time for the UE 500 between use of one of the antenna ports and use of any other antenna port in the antenna port combination.

The base station 105 that receives the antenna port compatibility message may learn which combinations are compatible for concurrent use and which are not. Based on this information, the base station 105 may select an uplink precoder to be applied to the antenna ports defined for UE 115-$b$. For example, base station 105 may select uplink precoder [a 0 b 0], which is supported because antenna port 1 and antenna port 3 are compatible for concurrent use. The base station 105 may avoid selecting an uplink precoder that requires concurrent use of antenna ports that are incompatible for concurrent use (e.g., the base station 105 may avoid selecting uplink precoder [a b 0 0], which requires concurrent use of antenna port 1 and antenna port 2).

In some cases, UE 500 may detect that several physical antennas 315 are co-located on the same antenna panel 505. For example, UE 500 may detect that physical antenna 315-$i$ and physical antenna 315-$j$ are both on antenna panel 505-$a$. UE 500 may also detect that physical antenna 315-$k$ and physical antenna 315-$l$ are both on antenna panel 505-$b$. Because the physical antennas 315 on an antenna panel 505 share the same analog beamforming, the physical antennas 315 may not support simultaneous transmission or reception of two different analog beams. However, physical antennas 315 on different antenna panels 505 may support simultaneous transmission or reception of two different analog beams. Thus, a UE 115 with only one antenna panel 505 may not support simultaneous communication using two different analog beams, but a UE 115 with multiple antenna panels 505 (e.g., like UE 500) may be able to communicate in such a manner (providing the analog beams are sent using physical antennas 315 that are on different antenna panels 505). UE 500 may determine which antenna port combinations can be used concurrently based on the location of their associated physical antennas and report that information to a base station 105. Thus, the UE 500 may inform the base station 105 about constraints in analog beamforming capabilities.

In the millimeter wave context, the UE 500 may send capability information (to the base station 105) that applies to specific beams or beam identifiers (IDs) that may or may not be compatible with each other. For example, UE 500 may sound a channel using two different beams at different times, but depending on the implementation, the UE 500 may or may not be able to support simultaneous use of both beams during subsequent data transmissions. For instance, if the two beams require the use of two different panels 505 that share the same transmit chain 320 or power amplifier, this may restrict the UE 500 to using only one of the panels 505 (and hence only one of the beams) at a given time. In this case, the UE 500 may update the base station 105 accordingly using a capability indication that specifies a compatible beam ID set or an incompatible beam ID set.

Figure 6:
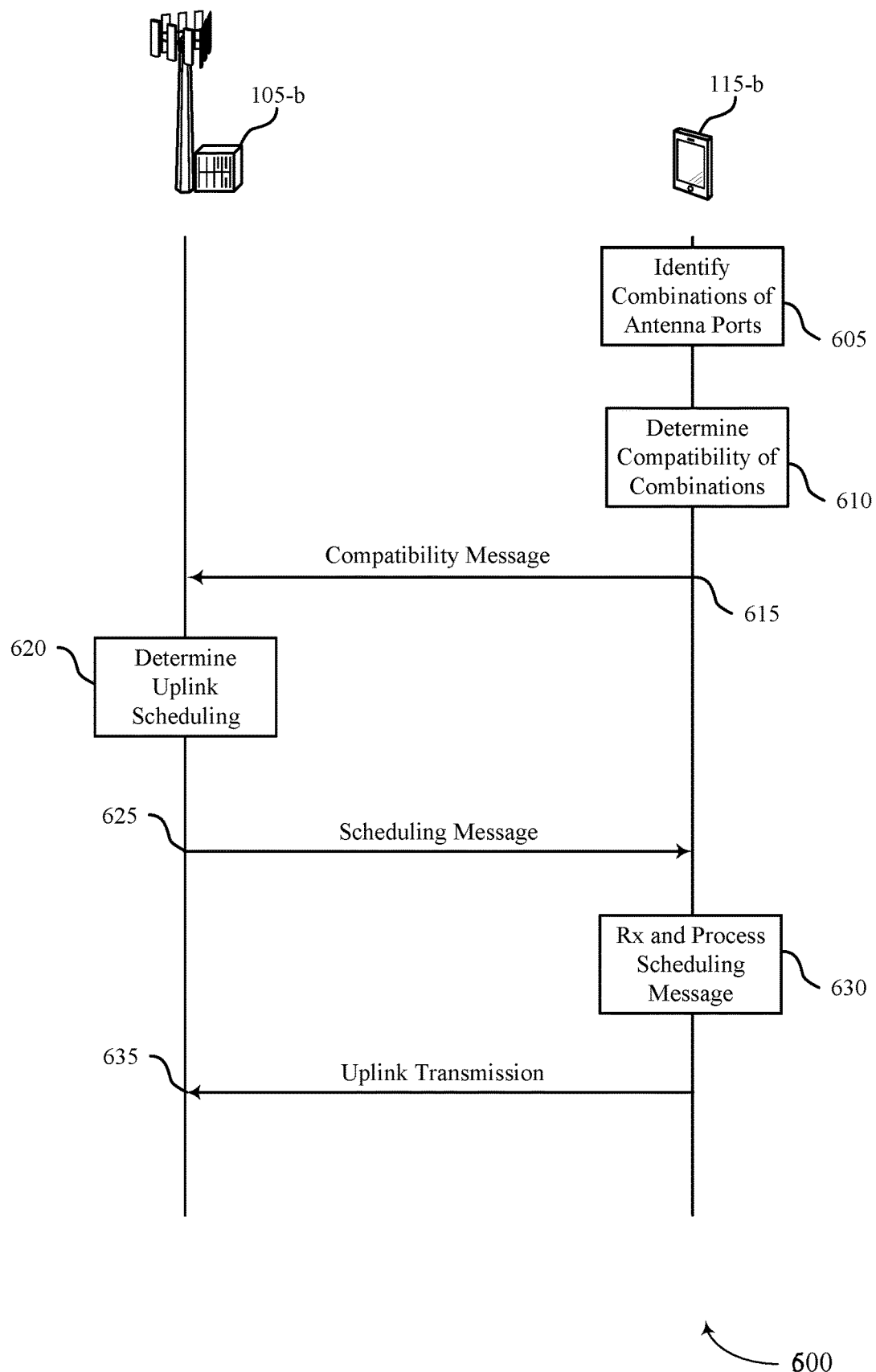
FIG. 6 illustrates an example of a process flow that supports antenna port compatibility signaling in accordance with aspects of the present disclosure.

FIG. 6 illustrates an example of a process flow 600 for antenna port compatibility signaling in accordance with various aspects of the present disclosure. Process flow 600 may include base station 105-$b$ and UE 115-$b$. UE 115-$b$ may include a number of physical antennas, transmit chains, and receive chains, and may be associated with multiple antenna ports.

At 605, UE 115-$b$ may identify combinations of antenna ports for communication with base station 105-$b$. At 610, UE 115-$b$ may determine which of the combinations are compatible for coincident use (e.g., concurrent or proximate use). At 615, UE 115-$b$ may transmit a compatibility message to base station 105-$b$ indicating the compatibility of the various antenna port combinations. In some cases, the compatibility message includes a compatible port set. The compatible port set may indicate which combinations of antenna ports are compatible for concurrent use (e.g., which antenna ports can be used simultaneously) and thus that two or more antenna ports are available for coincident use. Additionally or alternatively, the compatibility message may include an incompatible port set (e.g., the message may include a combination of compatible and incompatible sets). Additionally, the compatibility message may indicate the combinations of antenna ports that are not compatible for concurrent use but that support proximate use. For example, the compatibility message may include a delay constraint value for each combination of antenna ports. The delay constraint value may indicate the duration of time UE 115-b must wait in between using the antenna ports in the combination. In such a scenario, the delay value may be zero for antenna port combinations that support concurrent use and non-zero for antenna port combinations that support proximate use but not concurrent use.

In some cases, the compatibility message may convey the compatibility of the antenna port sets in a bit-map. The bit-map may indicate whether an antenna port belongs to the compatible port set or the incompatible port set. In some examples, UE 115-b may determine how many antenna ports are in each set and transmit an indication of the set with the fewest number of antenna ports. For example, UE 115-b may transmit an indication of whether two or more antenna ports, or some other number of antenna ports are available for concurrent use. In some cases, an indication of whether two or more antenna ports are available for concurrent use may include an indication of a number of antenna ports available for concurrent use (e.g., zero or one, which may mean that only one antenna port may be used at a time and thus that two or more antenna ports are not available for concurrent use, or some other threshold number of antenna ports (e.g., two, four, or six), where any number of antenna ports up to the threshold number of antenna ports are available for concurrent use and thus indicating that two or more antenna ports are available for concurrent use). In such a scenario, UE 115-b may include an indication in the compatibility message that conveys which set (compatible or incompatible) is being sent. In some examples, the compatibility message may convey the set (e.g., the compatible or incompatible set) in the form of a binary compatibility matrix. For example the ith/jth entry of the matrix may indicate whether port i and port j are compatible. Alternatively, a compatibility matrix may use values that indicate the delay constraint between using each antenna port combination, where a zero delay constraint indicates that the combination supports concurrent use and a positive number indicates a delay (e.g., in TTIs, symbols, slots, microseconds, etc.) between use of antenna ports of the combination.

At 620, base station 105-b may determine uplink scheduling for UE 115-b based on the compatibility message. For example, base station 105-b may determine which antenna ports are to send SRS simultaneously and which antenna ports are to send SRS after a delay. Additionally or alternatively, base station 105-b may determine an uplink precoder for use by UE 115-b. The precoder may be based on the compatibility message and may indicate the precoding weights that UE 115-b is to apply to its antenna ports during an uplink transmission. At 625, base station 105-b may transmit a scheduling message to UE 115-b. The scheduling message may include an indication of antenna ports to be used for concurrent SRS transmissions and/or an indication of antenna ports to be used for SRS transmissions separated in time (e.g., the scheduling message may be a reference signal configuration message). The scheduling message may additionally or alternatively include an indication of the uplink precoder. At 630, UE 115-b may receive and process the scheduling message sent from base station 105-b. At 635, UE 115-b may transmit an uplink transmission to base station 105 according to the uplink precoder (e.g., UE 115-b may the uplink precoder to an antenna port combination) and/or according to the SRS scheduling information. In some cases, the uplink transmission includes data. In other cases, the uplink transmission includes SRS.

Figure 7:
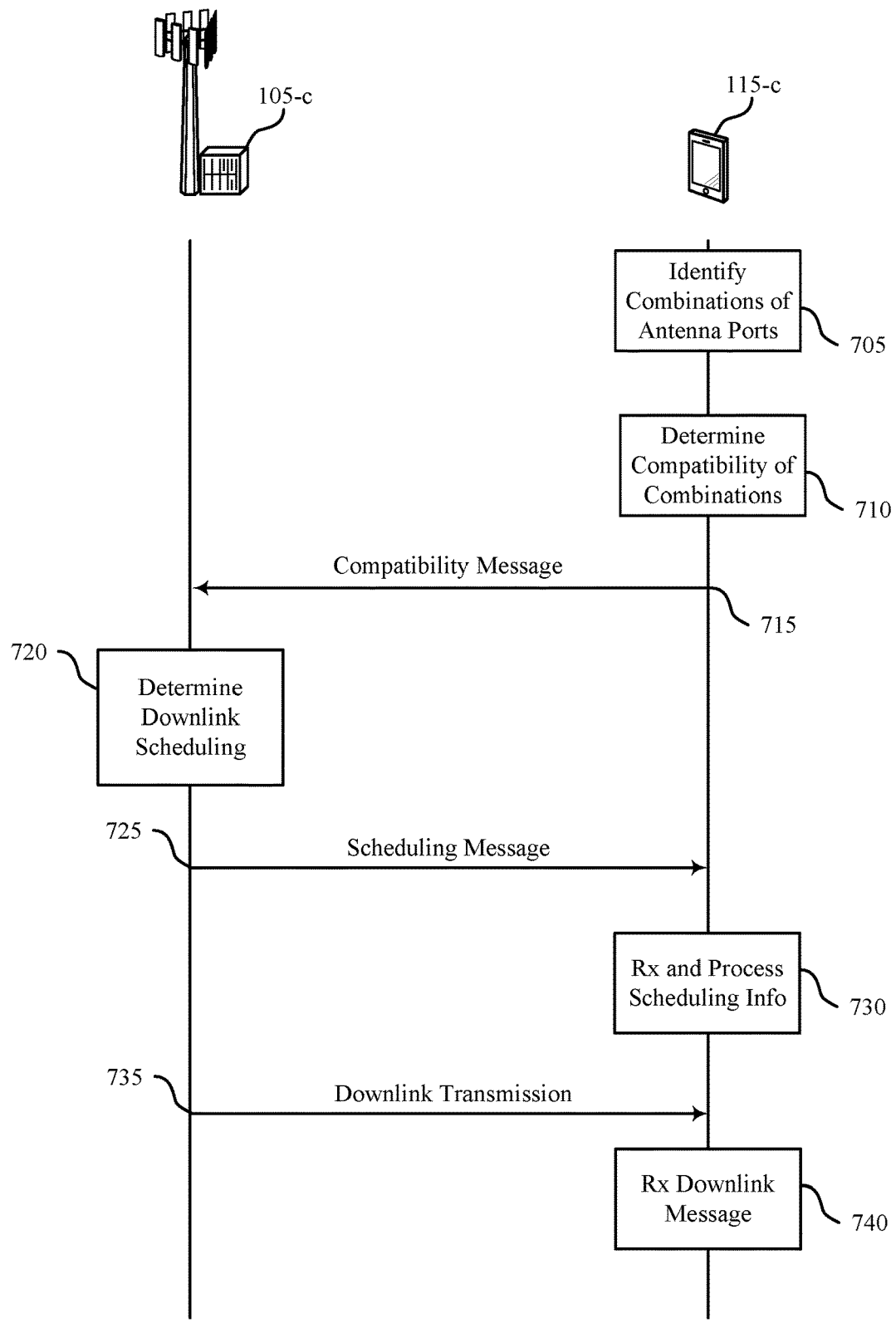
FIG. 7 illustrates an example of a process flow for antenna port compatibility signaling in accordance with aspects of the present disclosure.

FIG. 7 illustrates an example of a process flow 700 for antenna port compatibility signaling in accordance with various aspects of the present disclosure. Process flow 700 may include base station 105-c and UE 115-c. UE 115-c may include a number of physical antennas, transmit chains, and receive chains, and may be associated with multiple antenna ports.

At 705, UE 115-c may identify combinations of antenna ports for communication with base station 105-c. At 710, UE 115-c may determine which of the combinations are compatible for coincident use. At 715, UE 115-c may transmit a compatibility message to base station 105-c indicating whether two or more antenna ports are available for coincident use based at least in part on the identified compatibility of the various antenna port combinations for coincident use. In some cases, the number of antenna ports available for coincident use (and thus whether antenna ports are available for coincident use) may differ for downlink transmissions versus uplink transmissions at a UE may be different for DL vs. UL. For example, UE 115-c may have a different number of transmit chains than receive chains (e.g., two transmit chains and four receive chains). Accordingly, a compatibility message regarding downlink transmissions (e.g., a compatibility message 715) may substantively differ (e.g., may indicate a different number of antenna ports available for coincident use, and thus may differ with respect to indicating whether two or more antenna ports are available for coincident use) from a compatibility message regarding uplink transmissions (e.g., a compatibility message 615). At 720, base station 105-c may determine downlink scheduling for UE 115-c. For example, base station 105-c may determine which antenna ports are to be used to receive a downlink transmission. The downlink scheduling may be based on the compatibility message.

At 725, base station 105-c may transmit a scheduling message to UE 115-c. The scheduling message may include an indication of antenna ports to be used for a subsequent communication from base station 105-c. At 730, UE 115-c may receive and process the scheduling message sent from base station 105-c. At 735, base station 105-c may transmit a downlink transmission to UE 115-c according to the scheduling information. At 740, UE 115-c may receive the downlink transmission from base station 105-c according to the scheduling information (e.g., using the antenna ports indicated by the scheduling information).

Figure 8:
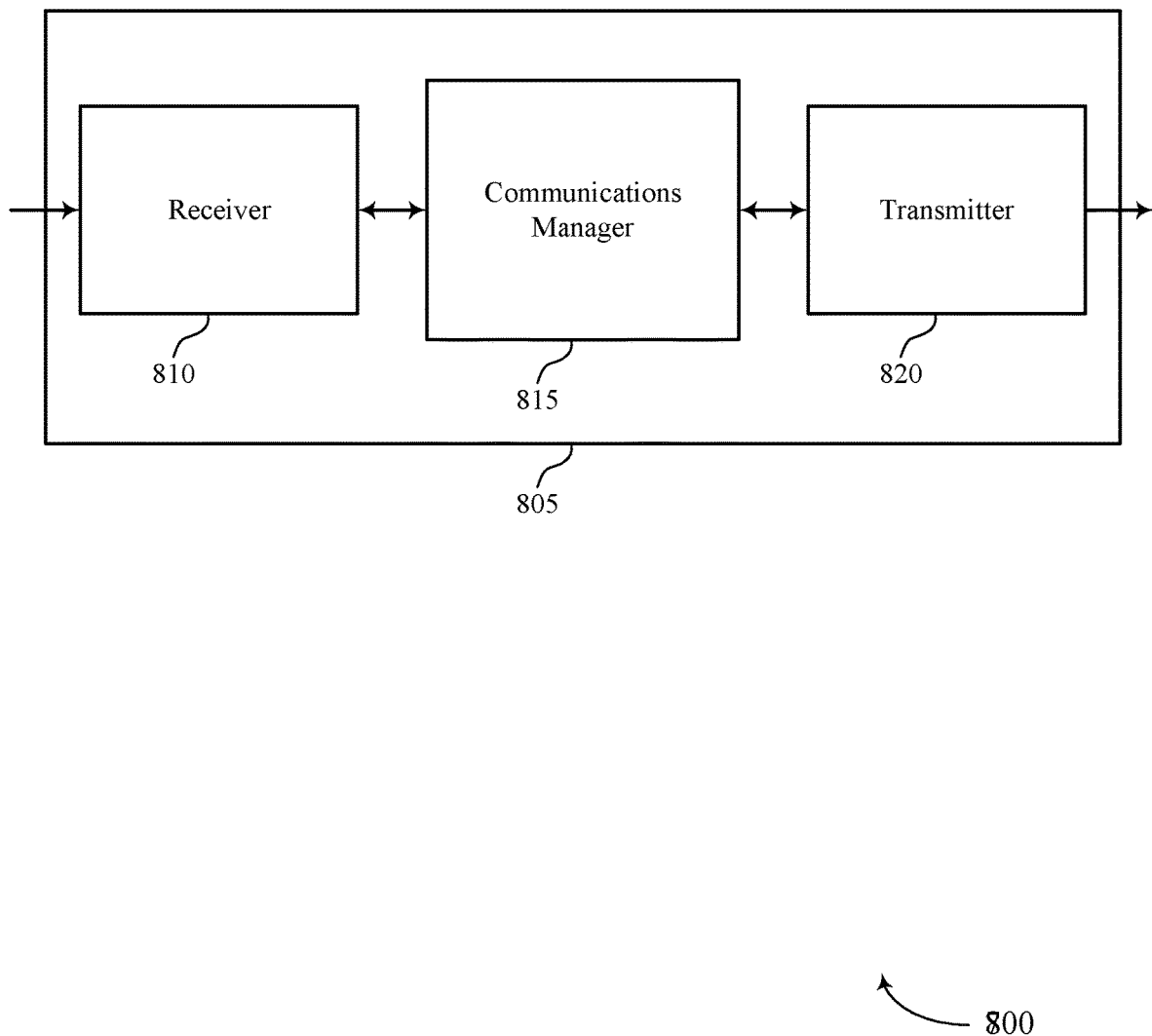
FIG. 8 shows a block diagram of a device that supports antenna port compatibility signaling in accordance with aspects of the present disclosure.

FIG. 8 shows a block diagram 800 of a wireless device 805 that supports antenna port capability signaling in accordance with aspects of the present disclosure. Wireless device 805 may be an example of aspects of a UE 115 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to antenna port compatibility signaling, etc.). Receiver 810 may be an example of a receiver 400 described with reference to FIG. 4. Receiver 810 may receive a scheduling message from a base station 105. In some examples, the scheduling message may indicate one or more antenna ports for communicating with the base station 105. In some examples, the scheduling message may indicate an uplink precoder for one or more antenna ports. Receiver 810 may also receive a downlink transmission (e.g., over one or more antenna ports, such as those indicated by the scheduling message). Information may be passed on to other components of the device. The receiver 810 may be an example of aspects of the transceiver 1035 described with reference to FIG. 10. The receiver 810 may utilize a single physical antenna or a set of physical antennas as described herein.

Communications manager 815 may be an example of aspects of the communications manager 1015 described with reference to FIG. 10. Communications manager 815 may identify a set of antenna ports associated with the wireless device 805 for communication with a base station 105. The communications manager 815 may identify the compatibility of antenna port combinations in the set of antenna ports for coincident use by the wireless device 805. The communications manager 815 transmit a message to a base station indicating whether two or more antenna ports are available for coincident use based at least in part on the identified compatibility of the antenna port combinations. The communications manager 815 may communicate with the base station via one or more of the antenna ports. The antenna port(s) used for communication may be selected based on the identified compatibility.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 820 may transmit signals generated by other components of the device. The transmitter 820 may be an example of the transmitter 300 described with reference to FIG. 30. In some examples, the transmitter 820 may be collocated with a receiver 810 in a transceiver module. For example, the transmitter 820 may be an example of aspects of the transceiver 1035 described with reference to FIG. 10. The transmitter 820 may utilize a physical single antenna or a set of physical antennas as described herein. In some cases, the transmitter 820 may receive information from other components of wireless device 805. In some examples, the transmitter 820 may transmit a message to a base station 105 that indicates the compatibility of one or more antenna port combinations for coincident, concurrent or proximate use.

Figure 9:
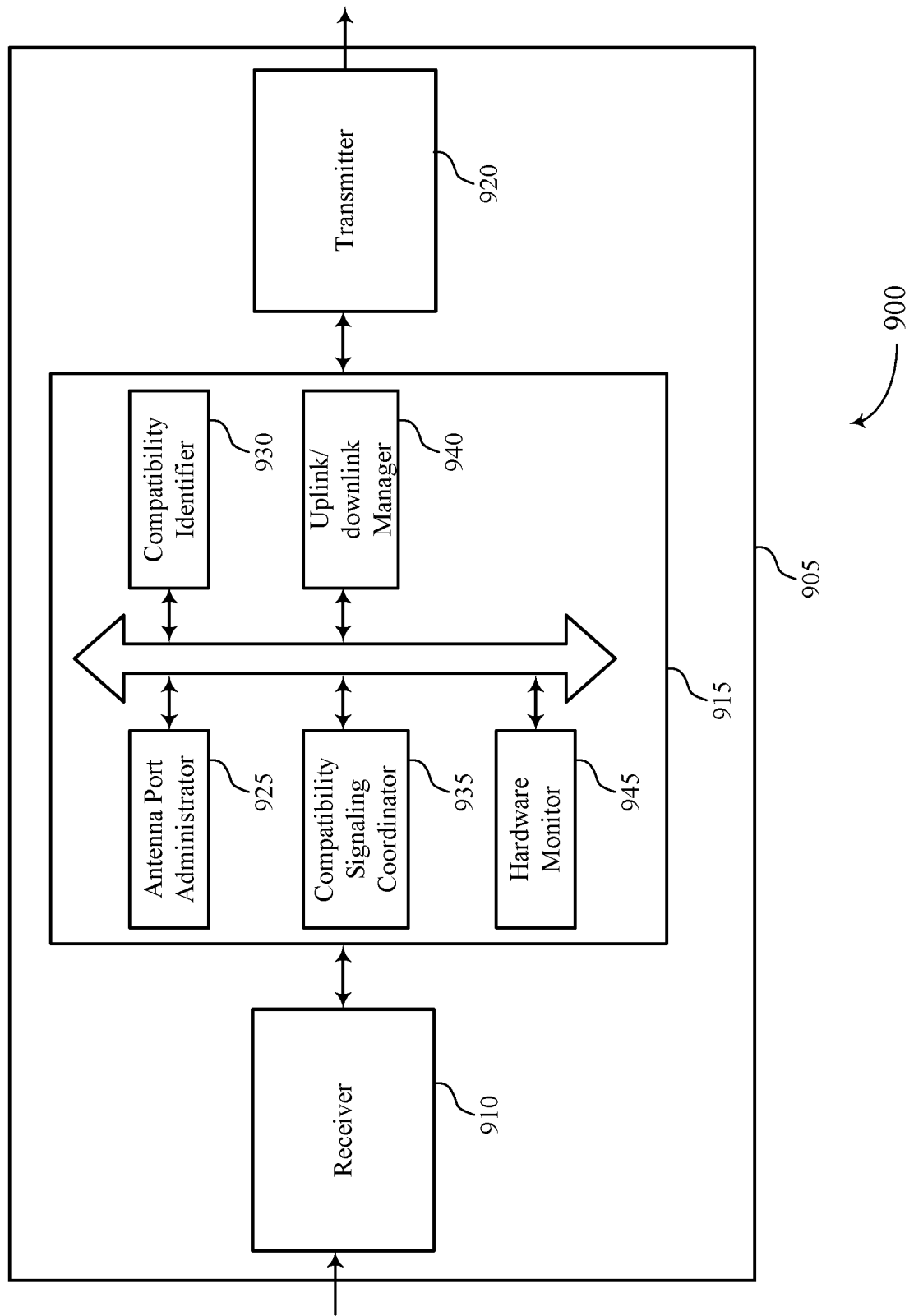
FIG. 9 shows a block diagram of a device that supports antenna port compatibility signaling in accordance with aspects of the present disclosure.

FIG. 9 shows a block diagram 900 of a wireless device 905 that supports antenna port compatibility signaling in accordance with aspects of the present disclosure. Wireless device 905 may be an example of aspects of a UE 115 or a wireless device 805 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to antenna port compatibility signaling, etc.). Information may be passed on to other components of the device. The receiver 910 may be an example of aspects of the transceiver 1035 described with reference to FIG. 10. The receiver 910 may utilize a single physical antenna or a set of physical antennas associated with antenna ports.

Communications manager 915 may be an example of aspects of the communications manager 1015 described with reference to FIG. 10. Communications manager 915 may include antenna port administrator 925, compatibility identifier 930, compatibility signaling coordinator 935, uplink/downlink manager 940, and hardware monitor 945. Each of these modules may communicate, directly or indirectly, with one another (e.g., via one or more buses).

Antenna port administrator 925 may identify a set of antenna ports associated with the wireless device 905. In some cases, antenna port administrator 925 identify a combination of antenna ports or receive an indication of a combination of antenna ports (e.g., from compatibility identifier 930). Antenna port administrator 925 may determine a delay between using antenna ports in the antenna port combination (e.g., by evaluating the hardware configuration of receiver 910 or transmitter 920). A zero delay may indicate that the antenna port combination is compatible for concurrent use. A non-zero delay may indicate that the antenna port combination includes a first antenna port that supports use after expiry of the delay from use of a second antenna port in the combination.

Compatibility identifier 930 may identify a compatibility of antenna port combinations for coincident use by the wireless device 905. Compatibility identifier 930 may detect that two antenna ports (e.g., a first antenna port and a second antenna port) in an antenna port combination share a physical antenna. Compatibility identifier 930 may determine that the antenna port combination is compatible for coincident use based on the detection that the two ports share a physical antenna. In some cases, compatibility identifier 930 may detect that two antenna ports (e.g., a first antenna port and a second antenna port) in an antenna port combination do not share a physical antenna. In such a scenario, the compatibility identifier 930 determine that the antenna port combination is incompatible for coincident use based on the detection that the two ports do not share a physical antenna. In some cases, the compatibility identifier 930 may detect that the antenna port combination includes antenna ports with independent transmit chains. In such cases, the compatibility identifier 930 may determine that the antenna port combination is compatible for coincident use based on the detection of the independent transmit chains.

Compatibility signaling coordinator 935 may transmit a message (e.g., to a base station 105) indicating whether two or more antenna ports are available for coincident use based at least in part on the identified compatibility of antenna port combinations. In some examples, compatibility signaling coordinator 935 may transmit an indication of the delay constraint determined by antenna port administrator 925 in the message. In some cases, the message indicates a set of antenna port combinations and a corresponding delay constraint for each. The delay constraint may indicate a duration of time between using antenna ports in the corresponding antenna port combination. In some cases, the message includes a compatible port set indicating an antenna port combination that is compatible for concurrent use and thus that two or more antenna ports are available for coincident use. In some cases, the message includes an incompatible port set indicating an antenna port combination that is incompatible for concurrent use. In some cases, the message includes a compatible port set indicating a first set of antenna port combinations that are compatible for concurrent use and an incompatible port set indicating a second set of antenna port combinations that are incompatible for concurrent use. In some cases, compatibility signaling coordinator 935 may convey the compatibility of a set of antenna port combinations in a bit-map or matrix. In some cases, the message may include an indication of a number of antenna ports available for coincident use—e.g., zero (meaning only one antenna port at a time), two, four, or six, or any other number—which may in some cases function as an indication of whether two or more of antenna ports are available for coincident use.

Uplink/downlink manager 940 may communicate with a base station 105 via one or more antenna ports. In some cases, the uplink/downlink manager 940 may select an antenna port for communication based on compatibility the antenna port. In some cases, the uplink/downlink manager 940 may receive a scheduling message from the base station indicating an uplink precoder a combination of antenna ports. The uplink/downlink manager 940 may apply the uplink precoder to the combination of antenna ports.

Hardware monitor 945 may determine a ratio of transmit chains to physical antennas for an antenna port combination. In some cases, the compatibility identifier 930 may identify compatibility of an antenna port combination based on the ratio. The hardware monitor 945 may detect that a number of physical antennas associated with an antenna port combination are co-located on an antenna panel. In such cases, the compatibility identifier 930 may identify compatibility of an antenna port combination based on the detection. In some cases, the hardware monitor 945 may detect that the antenna ports in an antenna port combination share a transmit chain. In such cases, the compatibility identifier 930 may determine that the antenna port combination is incompatible for coincident use based on the detection.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single physical antenna or a set of physical antennas.

Figure 10:
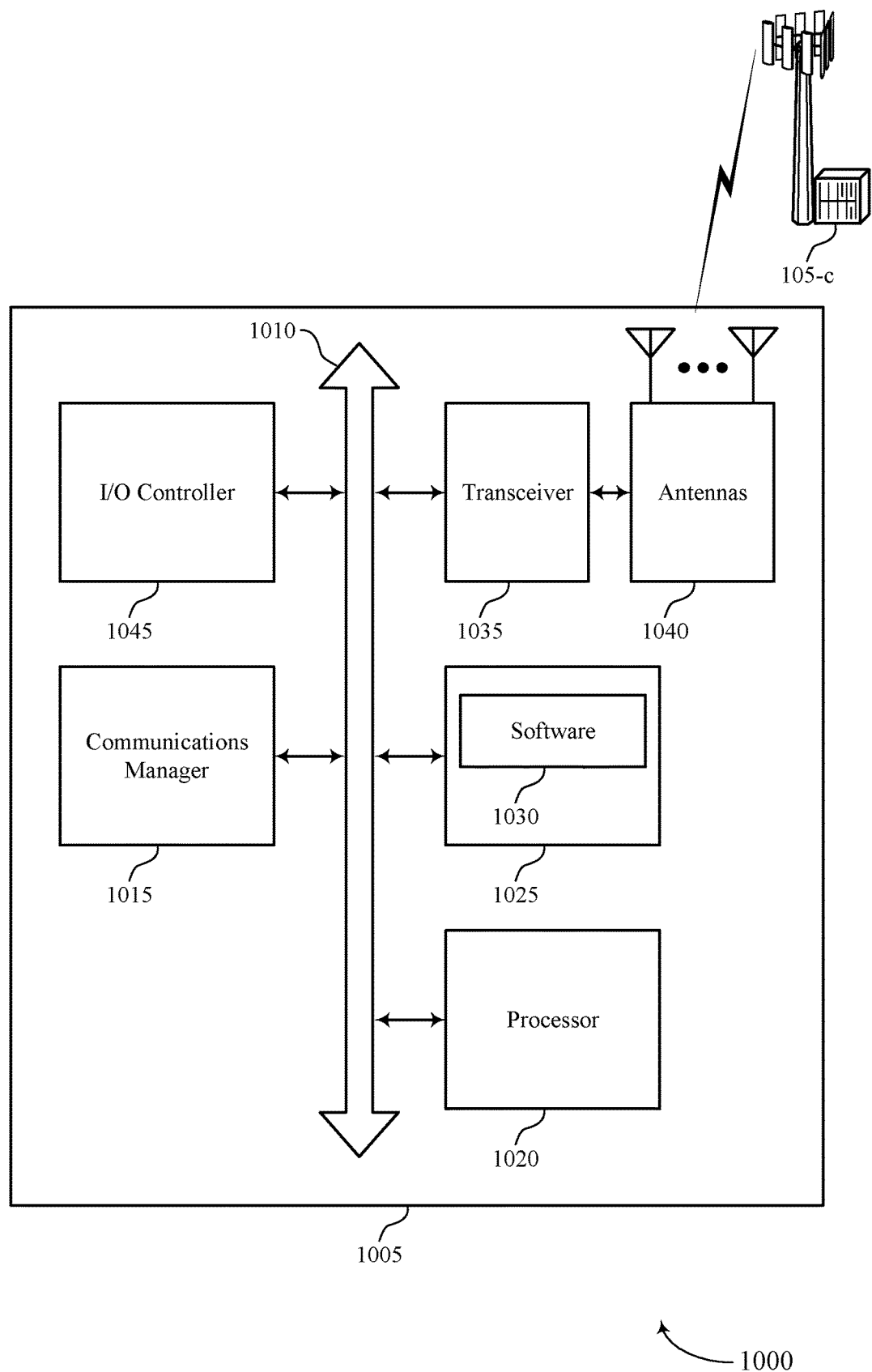
FIG. 10 illustrates a block diagram of a system including a UE that supports antenna port compatibility signaling in accordance with aspects of the present disclosure.

FIG. 10 shows a diagram of a system 1000 including a device 1005 that supports antenna port compatibility signaling in accordance with aspects of the present disclosure. Device 1005 may be an example of or include the components of wireless device 805, wireless device 905, or a UE 115 as described above, e.g., with reference to FIGS. 8 and 9. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105 (e.g., using one or more antenna ports).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting antenna port compatibility signaling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support antenna port compatibility signaling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. The transceiver 1035 may facilitate communications over antennas 1040, which may be examples of the physical antennas 315 described herein.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
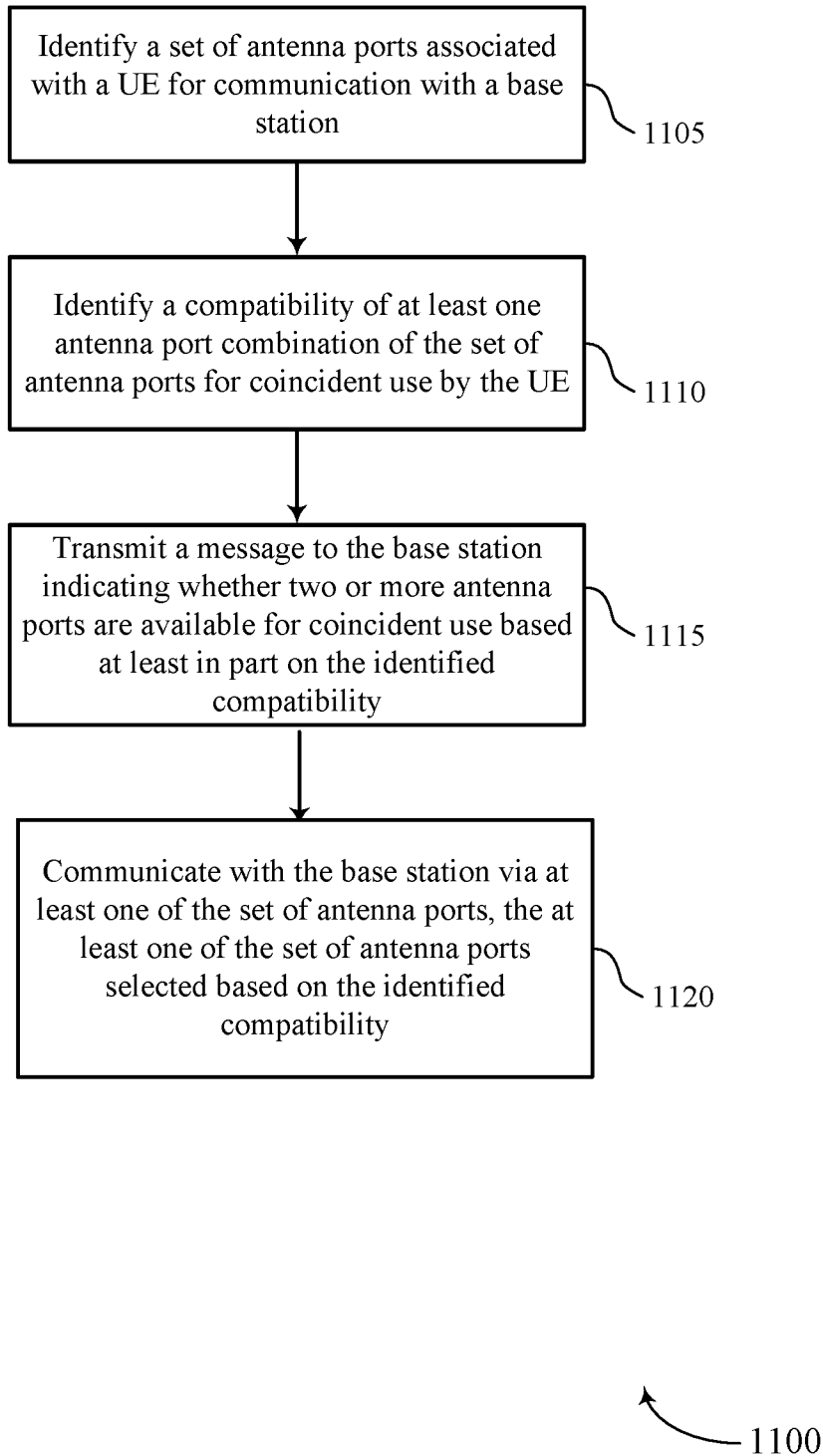
FIGS. 11 through 13 illustrate methods for antenna port compatibility signaling in accordance with aspects of the present disclosure.

FIG. 11 shows a flowchart illustrating a method 1100 for antenna port compatibility signaling in accordance with aspects of the present disclosure. The operations of method 1100 may be implemented by a UE 115 or its components as described herein. For example, the operations of method 1100 may be performed by a communications manager as described with reference to FIGS. 8 and 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify a plurality of antenna ports associated with the UE 115 for communication with a base station. The operations of block 1105 may be performed according to the methods described herein. In certain examples, aspects of the operations of block 1105 may be performed by an antenna port administrator as described with reference to FIG. 9.

At block 1110 the UE 115 may identify the compatibility of at least one antenna port combination of the plurality of antenna ports for coincident use by the UE 115. The operations of block 1110 may be performed according to the methods described herein. In certain examples, aspects of the operations of block 1110 may be performed by a compatibility identifier as described with reference to FIG. 9.

At block 1115 the UE 115 may transmit a message to the base station indicating whether two or more antenna ports are available for coincident use based at least in part on the identified compatibility. The operations of block 1115 may be performed according to the methods described herein. In certain examples, aspects of the operations of block 1115 may be performed by a compatibility signaling coordinator as described with reference to FIG. 9.

At block 1120 the UE 115 may communicate with the base station via at least one of the plurality of antenna ports. The at least one of the plurality of antenna ports may be selected based at least in part on the identified compatibility. The operations of block 1120 may be performed according to the methods described herein. In certain examples, aspects of the operations of block 1120 may be performed by a uplink/downlink manager as described with reference to FIG. 9.

Figure 12:
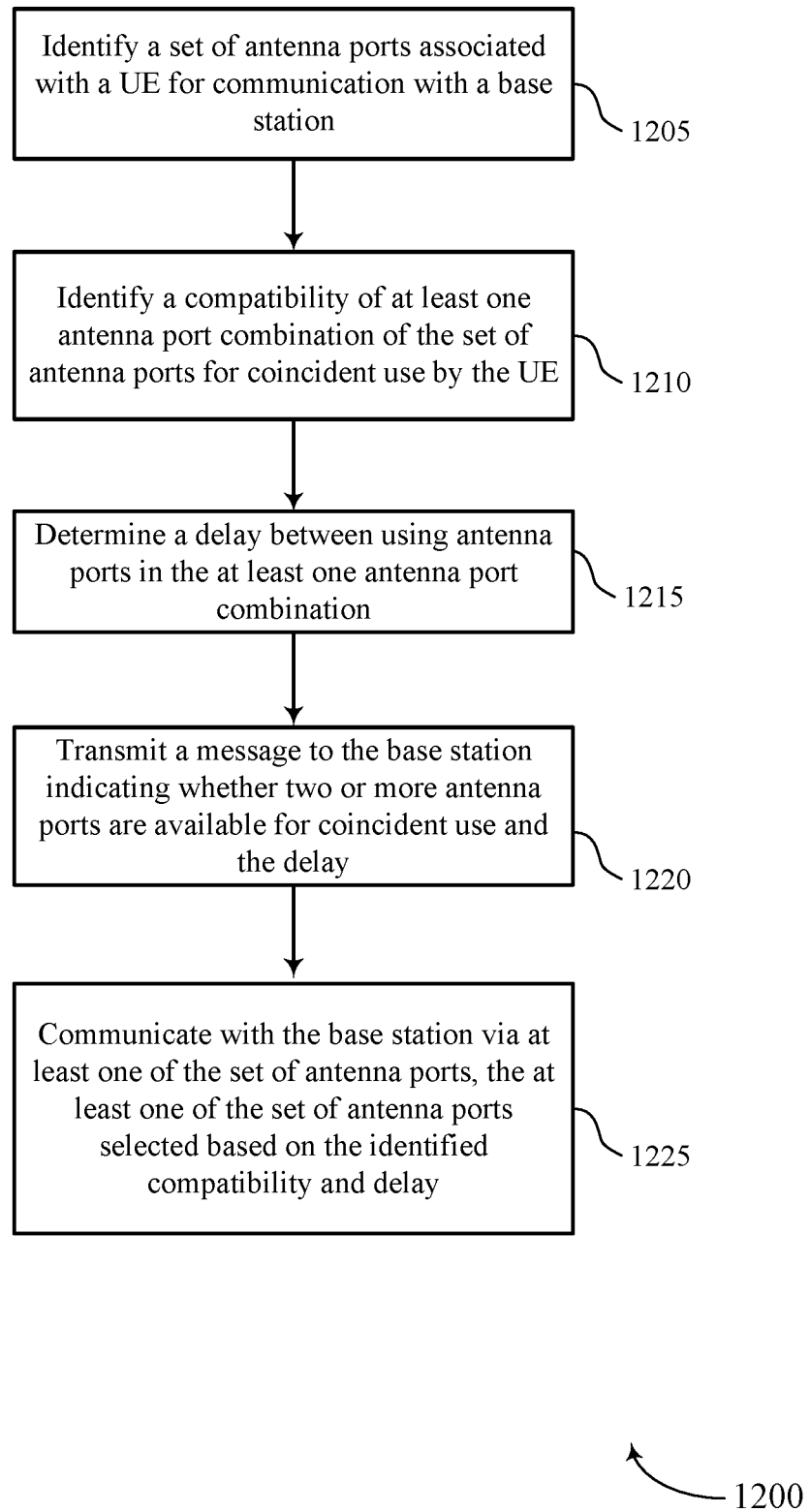

FIG. 12 shows a flowchart illustrating a method 1200 for antenna port compatibility signaling in accordance with aspects of the present disclosure. The operations of method 1200 may be implemented by a UE 115 or its components as described herein. For example, the operations of method 1200 may be performed by a communications manager as described with reference to FIGS. 8 and 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a plurality of antenna ports associated with the UE 115 for communication with a base station. The operations of block 1205 may be performed according to the methods described herein. In certain examples, aspects of the operations of block 1205 may be performed by an antenna port administrator as described with reference to FIG. 9.

At block 1210 the UE 115 may identify a compatibility of at least one antenna port combination of the plurality of antenna ports for coincident use by the UE 115. The operations of block 1210 may be performed according to the methods described herein. In certain examples, aspects of the operations of block 1210 may be performed by a compatibility identifier as described with reference to FIG. 9.

At block 1215 the UE 115 may determine a delay constraint between using antenna ports in the at least one antenna port combination. The operations of block 1215 may be performed according to the methods described herein. In certain examples, aspects of the operations of block 1215 may be performed by an antenna port administrator as described with reference to FIG. 9.

At block 1220 the UE 115 may transmit a message to the base station indicating the compatibility and the delay constraint. The operations of block 1220 may be performed according to the methods described herein. In certain examples, aspects of the operations of block 1220 may be performed by a compatibility signaling coordinator as described with reference to FIG. 9.

At block 1225 the UE 115 may communicate with the base station via at least one of the plurality of antenna ports. The at least one of the plurality of antenna ports may be selected based at least in part on the indicated compatibility and delay constraint. The operations of block 1225 may be performed according to the methods described herein. In certain examples, aspects of the operations of block 1225 may be performed by a uplink/downlink manager as described with reference to FIG. 9.

Figure 13:
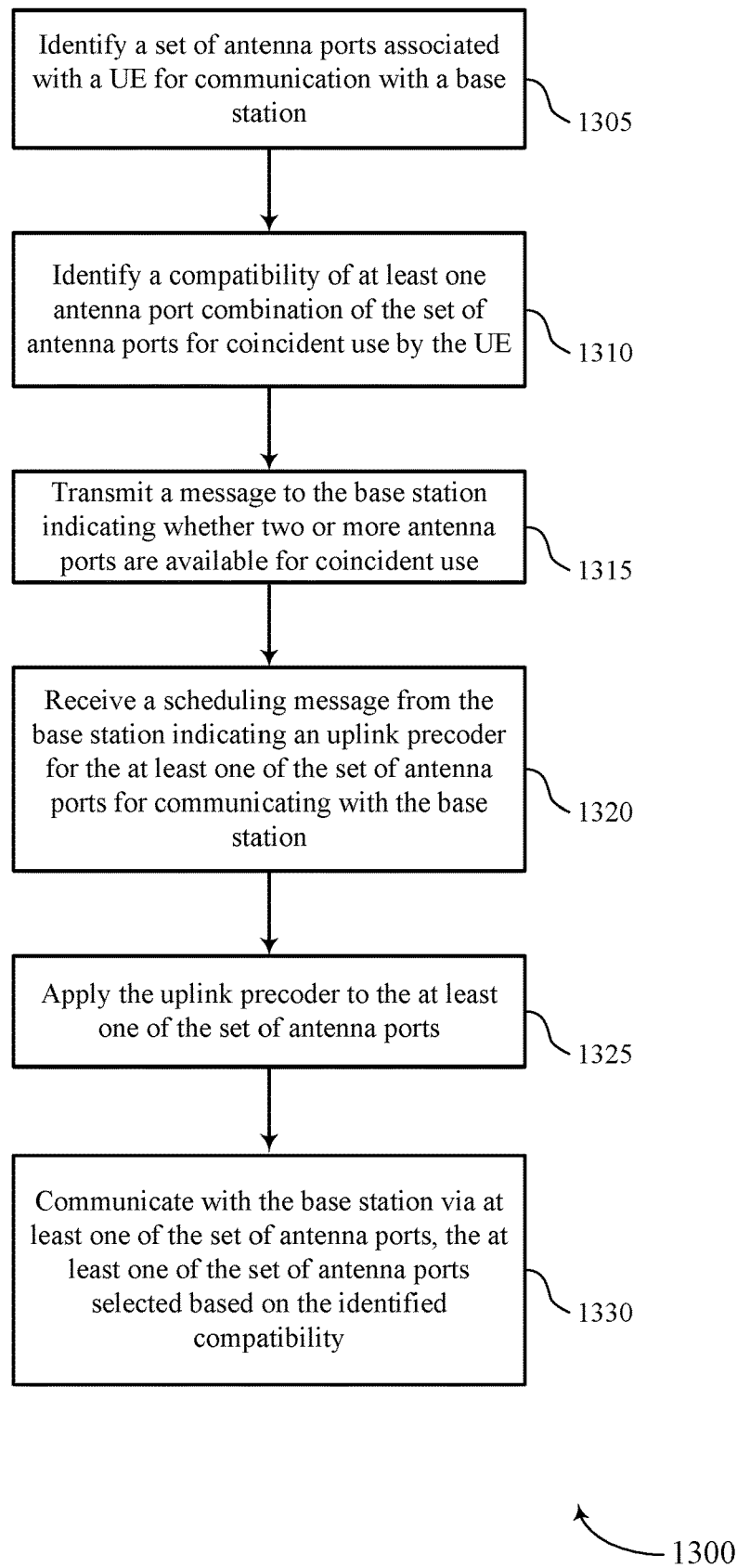

FIG. 13 shows a flowchart illustrating a method 1300 for antenna port compatibility signaling in accordance with aspects of the present disclosure. The operations of method 1300 may be implemented by a UE 115 or its components as described herein. For example, the operations of method 1300 may be performed by a communications manager as described with reference to FIGS. 8 and 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a plurality of antenna ports associated with the UE 115 for communication with a base station. The operations of block 1305 may be performed according to the methods described herein. In certain examples, aspects of the operations of block 1305 may be performed by an antenna port administrator as described with reference to FIG. 9.

At block 1310 the UE 115 may identify a compatibility of at least one antenna port combination of the plurality of antenna ports for coincident use by the UE. The operations of block 1310 may be performed according to the methods described herein. In certain examples, aspects of the operations of block 1310 may be performed by a compatibility identifier as described with reference to FIG. 9.

At block 1315 the UE 115 may transmit a message to the base station indicating the compatibility. The operations of block 1315 may be performed according to the methods described herein. In certain examples, aspects of the operations of block 1315 may be performed by a compatibility signaling coordinator as described with reference to FIG. 9.

At block 1320 the UE 115 may receive a scheduling message from the base station indicating an uplink precoder for the at least one of the plurality of antenna ports for communicating with the base station. The operations of block 1320 may be performed according to the methods described herein. In certain examples, aspects of the operations of block 1320 may be performed by a uplink/downlink manager as described with reference to FIG. 9.

At block 1325 the UE 115 may apply the uplink precoder to the at least one of the plurality of antenna ports. The operations of block 1325 may be performed according to the methods described herein. In certain examples, aspects of the operations of block 1325 may be performed by a uplink/downlink manager as described with reference to FIG. 9.

At block 1330 the UE 115 may communicate with the base station via at least one of the plurality of antenna ports. The at least one of the plurality of antenna ports may be selected based at least in part on the indicated compatibility. The operations of block 1330 may be performed according to the methods described herein. In certain examples, aspects of the operations of block 1330 may be performed by a uplink/downlink manager as described with reference to FIG. 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) having a plurality of antenna ports, comprising:
    identifying a compatibility of at least one antenna port combination of the plurality of antenna ports for coincident use by the UE;
    transmitting a message to a base station comprising a compatible port set indicating that two or more antenna ports are available for coincident use based at least in part on the identified compatibility; and
    communicating with the base station via at least one of the plurality of antenna ports, the at least one of the plurality of antenna ports selected based at least in part on the identified compatibility.

2. The method of claim 1, further comprising:
    receiving a scheduling or reference signal configuration message from the base station indicating an uplink precoder for the at least one of the plurality of antenna ports for communicating with the base station; and
    applying the uplink precoder to the at least one of the plurality of antenna ports.

3. The method of claim 1, further comprising:
    receiving a scheduling message from the base station indicating the at least one of the plurality of antenna ports; and
    receiving a downlink transmission over the at least one of the plurality of antenna ports.

4. The method of claim 1, further comprising:
    detecting that the at least one antenna port combination comprises antenna ports that share a transmit chain, wherein identifying the compatibility comprises:
        determining that the at least one antenna port combination is incompatible for coincident use based on the detection.

5. The method of claim 1, further comprising:
detecting that the at least one antenna port combination comprises antenna ports with independent transmit chains, wherein identifying the compatibility comprises:
determining that the at least one antenna port combination is compatible for coincident use based on the detection.

6. The method of claim 1, further comprising:
determining a ratio of transmit chains to physical antennas for the at least one antenna port combination, wherein the identifying is based on the ratio.

7. The method of claim 1, further comprising:
detecting that a first antenna port and a second antenna port of the at least one antenna port combination share a physical antenna, wherein identifying the compatibility comprises:
determining that the at least one antenna port combination is compatible for coincident use based on the detection.

8. The method of claim 1, further comprising:
detecting that a first antenna port and a second antenna port of the at least one antenna port combination do not share a physical antenna, wherein identifying the compatibility comprises:
determining that the at least one antenna port combination is incompatible for coincident use based on the detection.

9. The method of claim 1, further comprising:
detecting that a number of physical antennas associated with the at least one antenna port combination are co-located on an antenna panel, wherein identifying the compatibility is based on the detection.

10. The method of claim 1, wherein the compatible port set is indicated via a bit-map or matrix.

11. A method for wireless communication at a user equipment (UE) having a plurality of antenna ports, comprising:
identifying a compatibility of at least one antenna port combination of the plurality of antenna ports for coincident use by the UE;
determining a delay constraint between using antenna ports in the at least one antenna port combination;
transmitting a message to a base station indicating whether two or more antenna ports are available for coincident use based at least in part on the identified compatibility, wherein the message comprises an indication of the delay constraint; and
communicating with the base station via at least one of the plurality of antenna ports, the at least one of the plurality of antenna ports selected based at least in part on the identified compatibility.

12. The method of claim 11, wherein:
the message indicates a plurality of antenna port combinations and corresponding delay constraints between using antenna ports for each of the plurality of antenna port combinations.

13. The method of claim 11, wherein the delay constraint comprises a delay value, and wherein a zero delay value indicates that the at least one antenna port combination is compatible for concurrent use and a non-zero delay value indicates that the at least one antenna port combination comprises an antenna port that supports use after expiry of the delay value from use of another antenna port of the at least one antenna port combination.

14. A method for wireless communication at a user equipment (UE) having a plurality of antenna ports, comprising:
identifying a compatibility of at least one antenna port combination of the plurality of antenna ports for coincident use by the UE;
transmitting a message to a base station indicating whether two or more antenna ports are available for coincident use based at least in part on the identified compatibility, wherein the message comprises an incompatible port set indicating that the at least one antenna port combination is incompatible for concurrent use; and
communicating with the base station via at least one of the plurality of antenna ports, the at least one of the plurality of antenna ports selected based at least in part on the identified compatibility.

15. The method of claim 1, wherein the message further comprises an incompatible port set indicating a second set of antenna port combinations that are incompatible for concurrent use.

16. The method of claim 1, wherein the message further comprises:
an indication of a number of antenna ports available for coincident use.

17. An apparatus for wireless communication at a user equipment (UE) having a plurality of antenna ports, comprising:
a processor;
memory in electronic communication with the processor; and
instructions stored in the memory and operable, when executed by the processor, to cause the apparatus to:
identify a compatibility of at least one antenna port combination of the plurality of antenna ports for coincident use by the UE;
transmit a message to a base station comprising a compatible port set indicating that two or more antenna ports are available for coincident use based at least in part on the identified compatibility; and
communicate with the base station via at least one of the plurality of antenna ports, the at least one of the plurality of antenna ports selected based at least in part on the identified compatibility.

18. The apparatus of claim 17, wherein the instructions are further executable by the processor to:
receive a scheduling message or reference signal configuration from the base station indicating an uplink precoder for the at least one of the plurality of antenna ports for communicating with the base station; and
apply the uplink precoder to the at least one of the plurality of antenna ports.

19. The apparatus of claim 17, wherein the instruction executable by the processor to communicate with the base station comprise instructions executable by the processor to:
receive a scheduling message from the base station indicating the at least one of the plurality of antenna ports; and
receive a downlink transmission over the at least one of the plurality of antenna ports.

20. The apparatus of claim 17, wherein the instructions are further executable by the processor to:
detect that the at least one antenna port combination comprises antenna ports with independent transmit chains, wherein the instructions executable by the processor to identify the compatibility comprise instructions executable by the processor to:

determine that the at least one antenna port combination is compatible for coincident use based on the detection.

21. The apparatus of claim 17, wherein the instructions are further executable by the processor to:
determine a ratio of transmit chains to physical antennas for the at least one antenna port combination, wherein the identifying is based on the ratio.

22. The apparatus of claim 17, wherein the instructions are further executable by the processor to:
detect that a first antenna port and a second antenna port of the at least one antenna port combination share a physical antenna, wherein the instructions executable by the processor to identify the compatibility comprise instructions executable by the processor to:
determine that the at least one antenna port combination is compatible for coincident use based on the detection.

23. The apparatus of claim 17, wherein the instructions are further executable by the processor to:
detect that a number of physical antennas associated with the at least one antenna port combination are co-located on an antenna panel, wherein identifying the compatibility is based on the detection.

24. The apparatus of claim 17, wherein the message further comprises:
an indication of a number of antenna ports available for coincident use.

25. An apparatus for wireless communication at a user equipment (UE) having a plurality of antenna ports, comprising:
a processor;
memory in electronic communication with the processor; and
instructions stored in the memory and operable, when executed by the processor, to cause the apparatus to:
identify a compatibility of at least one antenna port combination of the plurality of antenna ports for coincident use by the UE;
determine a delay constraint between using antenna ports in the at least one antenna port combination;
transmit a message to a base station indicating whether two or more antenna ports are available for coincident use based at least in part on the identified compatibility, wherein the message comprises an indication of the delay constraint in the message to the base station; and
communicate with the base station via at least one of the plurality of antenna ports, the at least one of the plurality of antenna ports selected based at least in part on the identified compatibility.

26. The apparatus of claim 25, wherein the delay constraint comprises a delay value, and wherein a zero delay value indicates that the at least one antenna port combination is compatible for concurrent use and a non-zero delay value indicates that the at least one antenna port combination comprises an antenna port that supports use after expiry of the delay value from use of another antenna port of the at least one antenna port combination.

27. An apparatus for wireless communication at a user equipment (UE) having a plurality of antenna ports, comprising:
means for identifying a compatibility of at least one antenna port combination of the plurality of antenna ports for coincident use by the UE;
means for transmitting a message to a base station comprising a compatible port set indicating that two or more antenna ports are available for coincident use based at least in part on the identified compatibility; and
means for communicating with the base station via at least one of the plurality of antenna ports, the at least one of the plurality of antenna ports selected based at least in part on the identified compatibility.

28. A non-transitory computer readable medium storing code for wireless communication at a user equipment (UE) having a plurality of antenna ports, the code comprising instructions executable by a processor to:
identify a compatibility of at least one antenna port combination of the plurality of antenna ports for coincident use by the UE;
transmit a message to a base station comprising a compatible port set indicating that two or more antenna ports are available for coincident use based at least in part on the identified compatibility; and
communicate with the base station via at least one of the plurality of antenna ports, the at least one of the plurality of antenna ports selected based at least in part on the identified compatibility.

* * * * *